US012387677B2

(12) United States Patent
Chung

(10) Patent No.: US 12,387,677 B2
(45) Date of Patent: Aug. 12, 2025

(54) PIXEL AND DISPLAY DEVICE

(71) Applicant: Samsung Display Co., Ltd., Yongin-si (KR)

(72) Inventor: Kyunghoon Chung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/516,356

(22) Filed: Nov. 21, 2023

(65) Prior Publication Data

US 2024/0290265 A1 Aug. 29, 2024

(30) Foreign Application Priority Data

Feb. 24, 2023 (KR) ........................ 10-2023-0025234

(51) Int. Cl.
*G09G 3/32* (2016.01)
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC ......... G09G 3/3233; G09G 2300/0819; G09G 2300/0852; G09G 2300/0861; G09G 2310/08; G09G 2320/0233
See application file for complete search history.

(56) References Cited

U.S. PATENT DOCUMENTS

| | | | | |
|---|---|---|---|---|
| 9,135,862 | B2 | 9/2015 | Park et al. | |
| 9,892,678 | B2 | 2/2018 | Song et al. | |
| 10,783,830 | B1 | 9/2020 | Lu et al. | |
| 10,818,230 | B1 | 10/2020 | Lu | |
| 2016/0042694 | A1* | 2/2016 | Lim | G09G 3/3233 345/78 |
| 2019/0347988 | A1* | 11/2019 | Zhang | G09G 3/3233 |
| 2022/0415254 | A1 | 12/2022 | Jeon et al. | |

FOREIGN PATENT DOCUMENTS

| | | | |
|---|---|---|---|
| KR | 10-1202039 | B1 | 11/2012 |
| KR | 10-2009748 | B1 | 8/2019 |
| KR | 10-2016391 | B1 | 8/2019 |
| KR | 10-2020-0036290 | A | 4/2020 |
| KR | 10-2333868 | B1 | 12/2021 |

* cited by examiner

*Primary Examiner* — Towfiq Elahi
(74) *Attorney, Agent, or Firm* — KILE PARK REED & HOUTTEMAN PLLC

(57) ABSTRACT

A pixel includes a light emitting element connected between a first power source line, through which a first power source is provided, and a first node, a first transistor including a first electrode electrically connected to the first node, a second electrode electrically connected to a second node, and a gate electrode electrically connected to a third node, a second transistor including a first electrode electrically connected to a data line through which a data signal is provided, a second electrode electrically connected to the third node, and a gate electrode for receiving a scan signal, a third transistor, a fourth transistor, and a first capacitor connected between the second node and the third node.

21 Claims, 20 Drawing Sheets

PIXEL AND DISPLAY DEVICE

CROSS-REFERENCE TO RELATED APPLICATION

The present application claims priority to and the benefit of Korean Patent Application No. 10-2023-0025234 filed on Feb. 24, 2023, in the Korean Intellectual Property Office, the entire disclosure of which is incorporated herein by reference.

BACKGROUND

Aspects of some embodiments of the present disclosure described herein relate to a pixel having relatively improved display quality, and a display device including the same.

A display device may be a device including various electronic parts such as a display panel capable of displaying image, an input sensor capable of sensing an external input, and an electronic module. The electronic parts may be electrically connected to each other by signal lines thus variously arranged. The display panel includes a plurality of pixels. Each of the plurality of pixels includes a light emitting element that generates light, and a pixel driving circuit that controls the amount of current flowing through the light emitting element. When a leakage current occurs in the pixel driving circuit within a pixel, a change may occur in the amount of current flowing through the light emitting element, which may degrade display quality.

The above information disclosed in this Background section is only for enhancement of understanding of the background and therefore the information discussed in this Background section does not necessarily constitute prior art.

SUMMARY

Aspects of some embodiments of the present disclosure include a pixel with relatively improved display quality and a display device including the same.

According to some embodiments of the present disclosure, a pixel includes a light emitting element connected between a first power source line, through which a first power source is provided, and a first node, a first transistor including a first electrode electrically connected to the first node, a second electrode electrically connected to a second node, and a gate electrode electrically connected to a third node, a second transistor including a first electrode electrically connected to a data line through which a data signal is provided, a second electrode electrically connected to the third node, and a gate electrode for receiving a scan signal, a third transistor including a first electrode, a second electrode electrically connected to the first node, and a gate electrode for receiving a compensation scan signal, a fourth transistor including a first electrode electrically connected to a reference voltage line through which a reference voltage is provided, a second electrode electrically connected to the third node, and a gate electrode for receiving an initialization scan signal, and a first capacitor connected between the second node and the third node.

According to some embodiments, the first electrode of the third transistor may be electrically connected to the first power source line.

According to some embodiments, the pixel may further include a fifth transistor including a first electrode electrically connected to the first node, a second electrode electrically connected to the first electrode of the first transistor, and a gate electrode for receiving a first emission signal.

According to some embodiments, the pixel may further include a sixth transistor including a first electrode electrically connected to the second node, a second electrode electrically connected to a second power source line through which a second power source having a voltage level lower than the first power source is provided, and a gate electrode for receiving a second emission signal.

According to some embodiments, during a first period, each of the initialization scan signal and the second emission signal may be at an active level.

According to some embodiments, during the first period, the reference voltage may be provided to the third node, and the second power source may be provided to the second node.

According to some embodiments, during a second period continuous with the first period, each of the initialization scan signal, the compensation scan signal, and the first emission signal may be at an active level.

According to some embodiments, during the second period, a voltage value, which is obtained by subtracting a threshold voltage of the first transistor from the reference voltage, may be provided to the second node.

According to some embodiments, during a third period continuous with the second period, the scan signal may be at an active level.

According to some embodiments, during the third period, the data signal may be provided to the third node.

According to some embodiments, during a fourth period continuous with the third period, each of the first emission signal and the second emission signal may be at an active level.

According to some embodiments, the pixel may further include a second capacitor connected between the second node and the first power source line.

According to some embodiments, the first electrode of the third transistor may be electrically connected to a first initialization voltage line through which a first initialization voltage is provided.

According to some embodiments, the pixel may further include a 2-1st capacitor connected between the second node and the first initialization voltage line.

According to some embodiments, the pixel may further include a 2-2nd capacitor connected between the second node and a second initialization voltage line through which a second initialization voltage having a voltage level different from a voltage level of the first initialization voltage is provided.

According to some embodiments, the first initialization voltage may be greater than a voltage level obtained by subtracting a threshold voltage of the first transistor from the reference voltage.

According to some embodiments, the pixel may further include a seventh transistor including a first electrode electrically connected to the second node, a second electrode electrically connected to a third initialization voltage line through which a third initialization voltage is provided, and a gate electrode for receiving an input scan signal.

According to some embodiments of the present disclosure, a display device includes a display panel including a plurality of pixels. According to some embodiments, each of the plurality of pixels includes a light emitting element connected between a first power source line, through which a first power source is provided, and a first node, a first transistor including a first electrode electrically connected to the first node, a second electrode electrically connected to a second node, and a gate electrode electrically connected to a third node, a second transistor including a first electrode electrically connected to a data line through which a data signal is provided, a second electrode electrically connected to the third node, and a gate electrode for receiving a scan signal, a third transistor including a first electrode electrically connected to the first power source line, a second electrode electrically connected to the first node, and a gate electrode for receiving a compensation scan signal, a fourth transistor including a first electrode electrically connected to a reference voltage line through which a reference voltage is provided, a second electrode electrically connected to the third node, and a gate electrode for receiving an initialization scan signal, and a first capacitor connected between the second node and the third node.

According to some embodiments, the display device may further include a fifth transistor including a first electrode electrically connected to the first node, a second electrode electrically connected to the first electrode of the first transistor, and a gate electrode for receiving a first emission signal, and a sixth transistor including a first electrode electrically connected to the second node, a second electrode electrically connected to a second power source line through which a second power source having a voltage level lower than the first power source is provided, and a gate electrode for receiving a second emission signal.

According to some embodiments, the pixel may further include a second capacitor connected between the second node and the first power source line.

BRIEF DESCRIPTION OF THE FIGURES

The above and other aspects and features of some embodiments of the present disclosure will become more apparent by describing in more detail aspects of some embodiments thereof with reference to the accompanying drawings.

DETAILED DESCRIPTION

Figure 1:
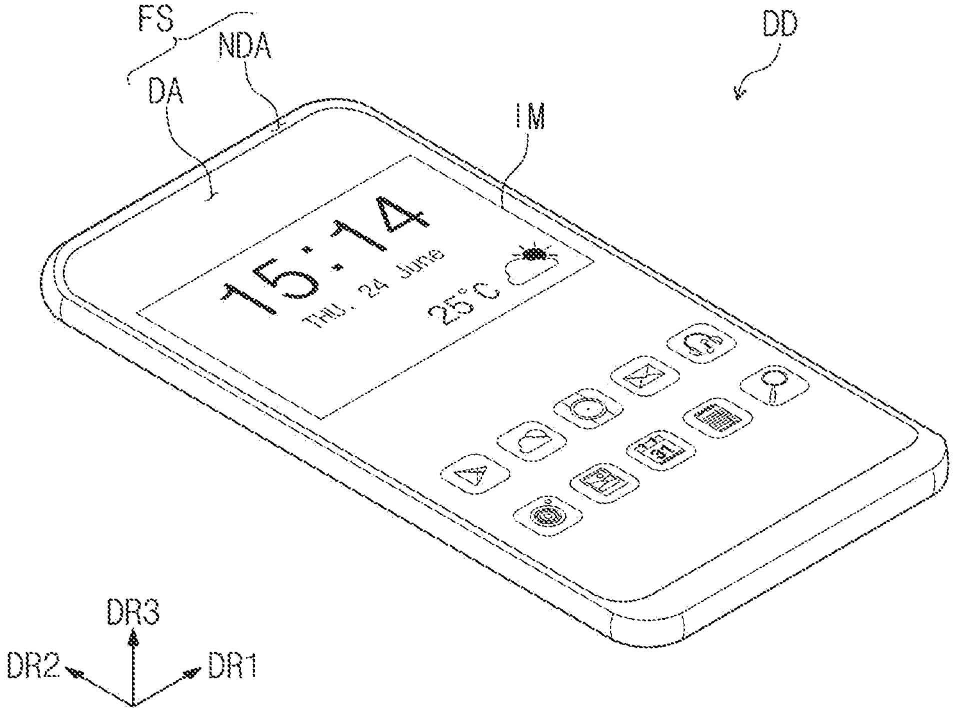
FIG. 1 is a perspective view of a display device, according to some embodiments of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, aspects of some embodiments of the present disclosure will be described in more detail with reference to accompanying drawings.

FIG. 1 is a perspective view of a display device, according to some embodiments of the present disclosure.

Referring to FIG. 1, a display device DD may have a shape having short sides extending in the first direction DR1, and long sides extending in the second direction DR2 crossing the first direction DR1. However, the shape of the display device DD is not limited thereto. For example, the display device DD may be implemented in various shapes, such as a relatively square, circular, elliptical, or polygonal shape and the display device DD, according to some embodiments, may have generally rounded corners.

The display device DD according to the present disclosure may be a small and medium-sized electronic device, such as a mobile phone, a tablet, a vehicle navigation system, or a game console, as well as a large-sized electronic device, such as a television or a monitor. These are just presented as only an embodiment. As a person having ordinary skill in the art would recognize, the display device DD may be capable of being employed in other display devices as long as these do not depart from the spirit and scope of embodiments according to the present disclosure.

As illustrated in FIG. 1, the display device DD may display an image IM on a display surface FS, which is parallel to a plane defined by each of a first direction DR1 and a second direction DR2, in a third direction DR3 crossing (or perpendicular or normal with respect to) the plane defined by the first direction DR1 and the second direction DR2. The display surface FS on which the image IM is displayed may correspond to a front surface of the display device DD.

The display surface FS of the display device DD may be divided into a plurality of areas. A display area DA and a non-display area NDA may be defined in the display surface FS of the display device DD.

The display area DA may be an area where the image IM is displayed, and a user may visually perceive the image IM at the display area DA. A shape of the display area DA may be defined substantially by the non-display area NDA. For example, the non-display area NDA may be arranged to surround (e.g., in a periphery or outside a footprint of) the display area DA. However, this is illustrated as an example. The non-display area NDA may be positioned to be adjacent to only one side of the display area DA or may be omitted. The display device DD according to some embodiments of the present disclosure may include various embodiments and is not limited to an embodiment.

The non-display area NDA may be an area adjacent to the display area DA, and may be an area in which the image IM is not displayed. The bezel area of the display device DD may be defined by the non-display area NDA.

The non-display area NDA may surround the display area DA. However, embodiments according to the present disclosure are not limited thereto. For example, the non-display area NDA may be adjacent to only a portion of the edge of the display area DA and is not limited to an embodiment.

Figure 2:
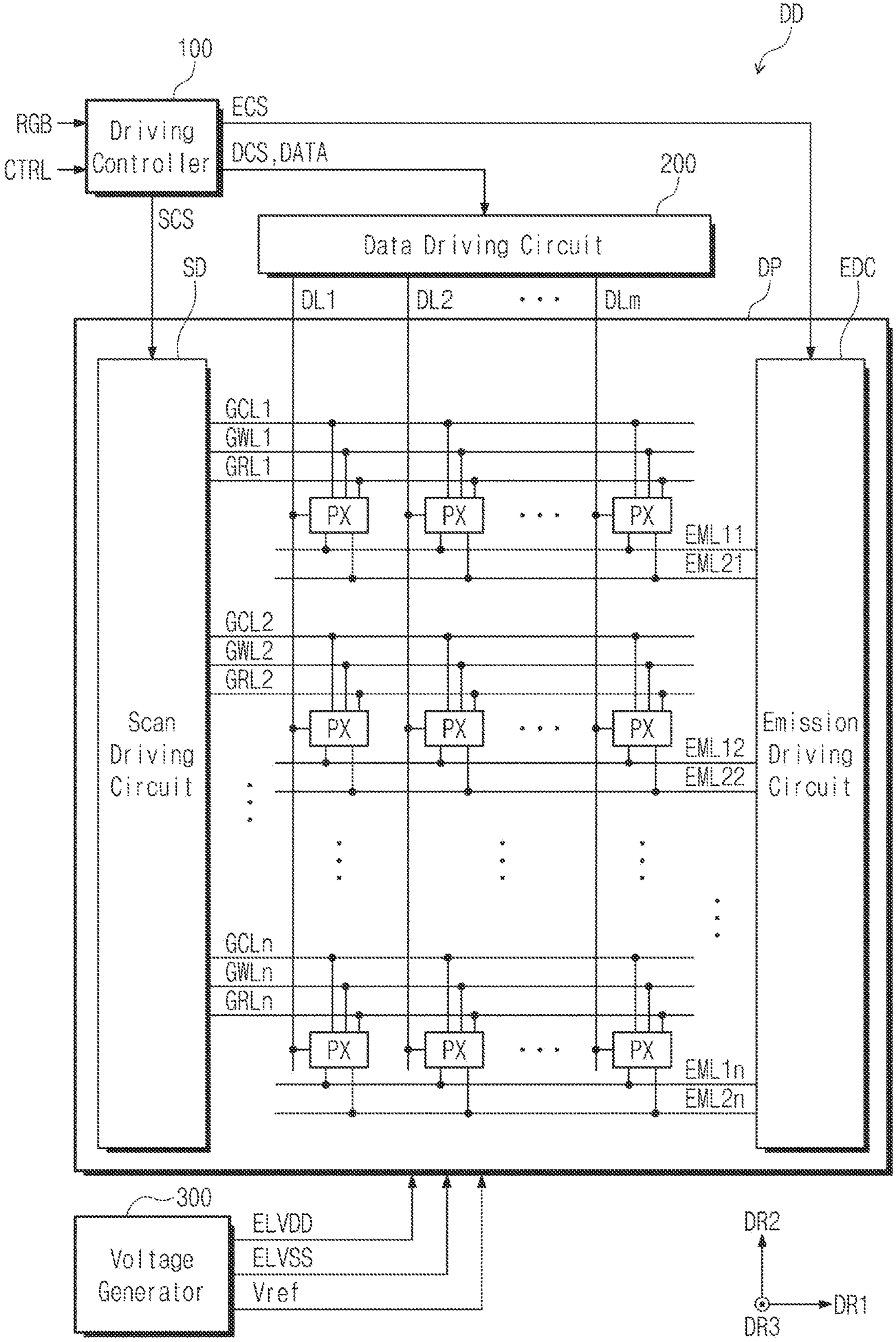
FIG. 2 is a block diagram of a display device, according to some embodiments of the present disclosure.

FIG. 2 is a block diagram of a display device, according to some embodiments of the present disclosure.

Referring to FIG. 2, the display device DD may include a display panel DP, a driving controller 100, a data driving circuit 200, and a voltage generator 300.

The display panel DP according to some embodiments of the present disclosure may be a light emitting display panel, but is not particularly limited thereto. For example, the display panel DP may be an organic light emitting display panel, a quantum dot light emitting display panel, a micro-LED display panel, or a nano-LED display panel. A light emitting layer of the organic light emitting display panel may include an organic light emitting material. A light emitting layer of the quantum dot light emitting display panel may include a quantum dot, a quantum rod, or the like. A light emitting layer of the micro-LED display panel may include a micro-LED. A light emitting layer of the nano-LED display panel may include a nano-LED.

The driving controller 100 may receive an image signal RGB and a control signal CTRL. The driving controller 100 may generate an image data signal DATA by converting a data format of the image signal RGB so as to be suitable for the interface specification of the data driving circuit 200. The driving controller 100 may output a scan control signal SCS, a data control signal DCS, and an emission control signal ECS.

The data driving circuit 200 may receive the data control signal DCS and the image data signal DATA from the driving controller 100. The data driving circuit 200 may convert the image data signal DATA into data signals Vdata (see FIG. 3) and may output the data signals Vdata (see FIG. 3) to a plurality of data lines DL1 to DLm, respectively. The data signals Vdata (see FIG. 3) may be analog voltages corresponding to grayscale values of the image data signal DATA.

According to some embodiments of the present disclosure, during a driving period of one frame, the data driving circuit 200 may output the data signals Vdata (see FIG. 3) corresponding to the image data signal DATA to the data lines DL1 to DLm, respectively.

The voltage generator 300 may generate voltages necessary to operate the display panel DP. According to some embodiments of the present disclosure, the voltage generator 300 may generate a first power source ELVDD, a second power source ELVSS, and a reference voltage Vref.

The display panel DP may include scan lines GCL1 to GCLn, GWL1 to GWLn, and GRL1 to GRLn, emission control lines EML11 to EML1*n* and EML21 to EML2*n*, the data lines DL1 to DLm, and pixels PX. The display panel DP may further include a scan driving circuit SD and an emission driving circuit EDC.

The scan driving circuit SD may be arranged on a first side of the display panel DP. The scan lines GCL1 to GCLn, GWL1 to GWLn, and GRL1 to GRLn may extend from the scan driving circuit SD in the first direction DR1.

The emission driving circuit EDC may be arranged on a second side of the display panel DP. The emission control lines EML11 to EML1*n* and EML21 to EML2*n* may extend from the emission driving circuit EDC in a direction opposite to the first direction DR1.

The scan lines GCL1 to GCLn, GWL1 to GWLn, and GRL1 to GRLn and the emission control lines EML11 to EML1*n* and EML21 to EML2*n* may be arranged spaced from one another in the second direction DR2.

The scan lines GCL1 to GCLn, GWL1 to GWLn, and GRL1 to GRLn may include the compensation scan lines GCL1 to GCLn, the write scan lines GWL1 to GWLn, and the initialization scan lines GRL1 to GRLn.

The emission control lines EML11 to EML1*n* and EML21 to EML2*n* may include the first emission control lines EML11 to EML1*n* and the second emission control lines EML21 to EML2*n*.

The data lines DL1 to DLm may extend from the data driving circuit 200 in a direction opposite to the second direction DR2. Each of the data lines DL1 to DLm may be arranged spaced from each other in the first direction DR1.

In the example shown in FIG. 2, the scan driving circuit SD and the emission driving circuit EDC are arranged to face each other with the pixels PX interposed therebetween, but the present disclosure is not limited thereto. For example, the scan driving circuit SD and the emission driving circuit EDC may be positioned adjacent to each other on one of the first side and the second side of the display panel DP. According to some embodiments, the scan driving circuit SD and the emission driving circuit EDC may be implemented with one circuit.

The plurality of pixels PX may be electrically connected to the scan lines GCL1 to GCLn, GWL1 to GWLn, and GRL1 to GRLn, the emission control lines EML11 to EML1*n* and EML21 to EML2*n*, and the data lines DL1 to DLm. Each of the plurality of pixels PX may be electrically connected to three scan lines and two emission control lines.

Figure 3:
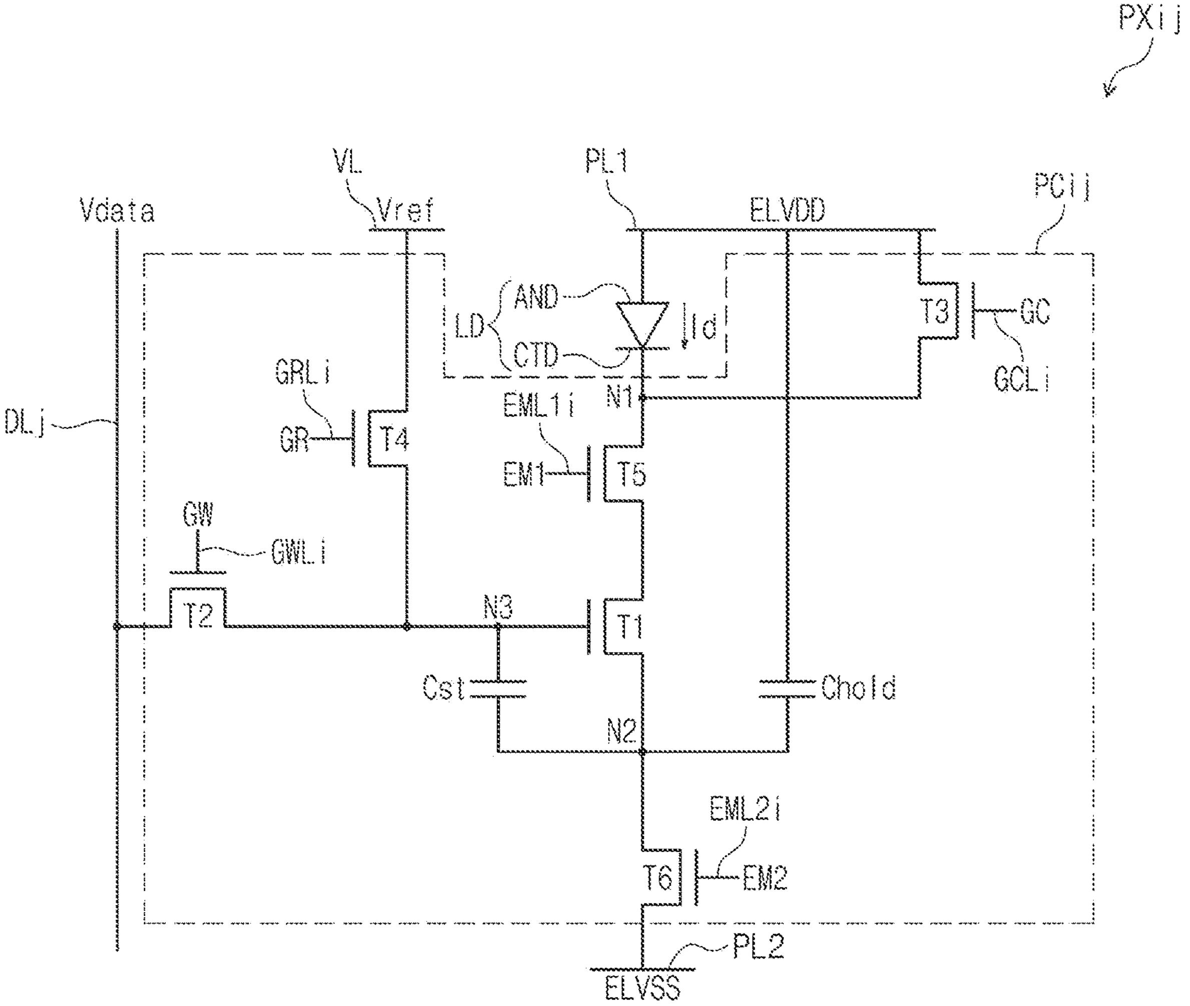
FIG. 3 is an equivalent circuit diagram of a pixel according to some embodiments of the present disclosure.

Each of the plurality of pixels PX may include the light emitting element LD (see FIG. 3) and a pixel circuit unit controlling light emission of the light emitting element LD (see FIG. 3).

The light emitting element LD (see FIG. 3) of each of the plurality of pixels PX may generate light of different colors. For example, the pixels PX may include red pixels generating red color light, green pixels generating green color light, and blue pixels generating blue color light. A light emitting element of a red pixel, a light emitting element of a green pixel, and a light emitting element of a blue pixel may include light emitting layers of different materials.

The pixel circuit unit may include at least one transistor and at least one capacitor. This will be described in more detail later. The scan driving circuit SD and the emission driving circuit EDC may include transistors formed through the same process as transistors of the pixel circuit unit.

Each of the plurality of pixels PX may receive the first power source ELVDD, the second power source ELVSS, and the reference voltage Vref from the voltage generator 300.

The scan driving circuit SD may receive the scan control signal SCS from the driving controller 100. The scan driving circuit SD may output scan signals to the scan lines GCL1 to GCLn, GWL1 to GWLn, and GRL1 to GRLn in response to the scan control signal SCS.

The emission driving circuit EDC may output emission signals to emission control lines EML11 to EML1*n* and EML21 to EML2*n* in response to the emission driving control signal ECS from the driving controller 100.

The driving controller 100 according to some embodiments of the present disclosure may determine an operating frequency and may control the data driving circuit 200, the scan driving circuit SD, and the emission driving circuit EDC depending on the determined operating frequency.

FIG. 3 is an equivalent circuit diagram of a pixel, according to some embodiments of the present disclosure. Each of the plurality of pixels PX shown in FIG. 2 may have the same circuit configuration as the equivalent circuit diagram of the pixel PXij shown in FIG. 3.

Referring to FIG. 3, the pixel PXij may be connected to a j-th data line DLj among the data lines DL1 to DLm, an i-th compensation scan line GCLi among the compensation scan lines GCL1 to GCLn, an i-th write scan line GWLi among the write scan lines GWL1 to GWLn, an i-th initialization scan line GRLi among the initialization scan lines GRL1 to GRLn, an i-th first emission control line EML1*i* among the first emission control lines EML11 to EML1*n*, and an i-th second emission control line EML2*i* among the second emission control lines EML21 to EML2*n*. Here, each of 'i' and 'j' is a natural number.

The pixel PXij may include the light emitting element LD and a pixel driving circuit PCij. The light emitting element LD may be a light emitting diode. For example, the light emitting element LD may be an organic light emitting diode including an organic light emitting layer. The pixel driving circuit PCij may be connected to the light emitting element LD to control the amount of current flowing through the light emitting element LD. The light emitting element LD may generate light having a luminance (e.g., a set or predetermined luminance) depending on the amount of current thus received.

The pixel driving circuit PCij may include first to sixth transistors T1, T2, T3, T4, T5, and T6 and capacitors Cst and Chold.

The pixel PX according to some embodiments of the present disclosure may be referred to as having a 6T2C structure.

Each of the first to sixth transistors T1, T2, T3, T4, T5, and T6 may be an N-type transistor by using an oxide semiconductor as a semiconductor layer. However, this is an example. For example, the semiconductor layer according to some embodiments of the present disclosure is not limited thereto, and may include amorphous silicon, low-temperature polycrystalline silicon (LTPS), crystalline silicon, and the like. Each of the first to sixth transistors T1, T2, T3, T4, T5, and T6 implemented as an N-type has a relatively small change in element characteristics or rate at which afterimages occur instantaneously. However, this is an example, and all of the first to sixth transistors T1, T2, T3, T4, T5, and T6 according to some embodiments of the present disclosure may be P-type transistors. According to some embodiments, at least one of the first to sixth transistors T1, T2, T3, T4, T5, or T6 may be a N-type transistor, and the others thereof may be P-type transistors.

The scan lines GCLi, GWLi, and GRLi may deliver scan signals GC, GW, and GR, respectively. The emission control lines EML1*i* and EML2*i* may deliver emission signals EM1 and EM2, respectively. The data line DLj may deliver the data signal Vdata. The data signal Vdata may have a voltage level corresponding to the image signal RGB (see FIG. 2) input to the display device DD (see FIG. 2).

A first power source line PL1 may provide the first power source ELVDD. A second power source line PL2 may provide the second power source ELVSS. The second power source ELVSS may have a lower voltage level than the first power source ELVDD. A reference voltage line VL may provide the reference voltage Vref.

The light emitting element LD may be connected between the first power source line PL1, through which the first power source ELVDD is provided, and a first node N1. The light emitting element LD may include an anode AND and a cathode CTD. The anode AND may be directly connected to the first power source line PL1. The cathode CTD may be electrically connected to the second power source line PL2 via the fifth transistor T5, the first transistor T1, and the sixth transistor T6.

When the light emitting element LD is an organic light emitting element, the light emitting element LD may further include an organic layer positioned between the anode AND and the cathode CTD. The cathode CTD of the light emitting element LD may be connected to the pixel driving circuit PCij through the first node N1. The light emitting element LD may emit light in response to the amount of the driving current Id flowing through the first transistor T1 of the pixel driving circuit PCij.

The first transistor T1 may include a first electrode electrically connected to the first node N1 via the fifth transistor T5, a second electrode electrically connected to a second node N2, and a gate electrode electrically connected to a third node N3. The first transistor T1 may be referred to as a driving transistor.

According to some embodiments of the present disclosure, the first transistor T1 may be an N-type transistor. The cathode CTD of the light emitting element LD may be connected to a drain (or the first electrode) of the first transistor T1. In this case, even when the light emitting element LD deteriorates, the voltage of a source terminal (or a second electrode) of the first transistor T1 may not shift. That is, even when the light emitting element LD deteriorates, the gate-source voltage (referred to as "Vgs") of the first transistor T1 may not change. Accordingly, because the range of a change in the amount of current flowing through the first transistor T1 is reduced even when the usage time of the pixel PX increases, the afterimage defect (or poor long-term afterimage) of the display panel DP (see FIG. 2) may be relatively reduced and the lifespan of the display panel DP (see FIG. 2) may be relatively improved. Accordingly, the pixel PXij with relatively improved display quality and the display device DD (see FIG. 1) including the same may be provided.

The second transistor T2 may include a first electrode electrically connected to the data line DLj through which the data signal Vdata is provided, a second electrode electrically connected to the third node N3, and a gate electrode receiving the scan signal GW. The gate electrode may be connected to the write scan line GWLi.

The third transistor T3 may include a first electrode electrically connected to the first power source line PL1, a second electrode electrically connected to the first node N1, and a gate electrode receiving the compensation scan signal GC. The gate electrode may be connected to the compensation scan line GCLi.

The fourth transistor T4 may include a first electrode electrically connected to the reference voltage line VL through which the reference voltage Vref is provided, a second electrode electrically connected to the third node N3, and a gate electrode receiving the initialization scan signal GR. The gate electrode may be connected to the initialization scan line GRLi.

The fifth transistor T5 may include a first electrode electrically connected to the first node N1, a second electrode electrically connected to the first electrode of the first transistor T1, and a gate electrode receiving the first emission signal EM1. The gate electrode may be connected to the first emission control line EML1*i*.

The sixth transistor T6 may include a first electrode electrically connected to the second node N2, a second electrode electrically connected to the second power source line PL2 through which the second power source ELVSS is provided, and a gate electrode receiving the second emission signal EM2. The gate electrode may be connected to the second emission control line EML2*i*.

The first capacitor Cst may be connected between the second node N2 and the third node N3.

The second capacitor Chold may be connected between the second node N2 and the first power source line PL1.

Figure 4:
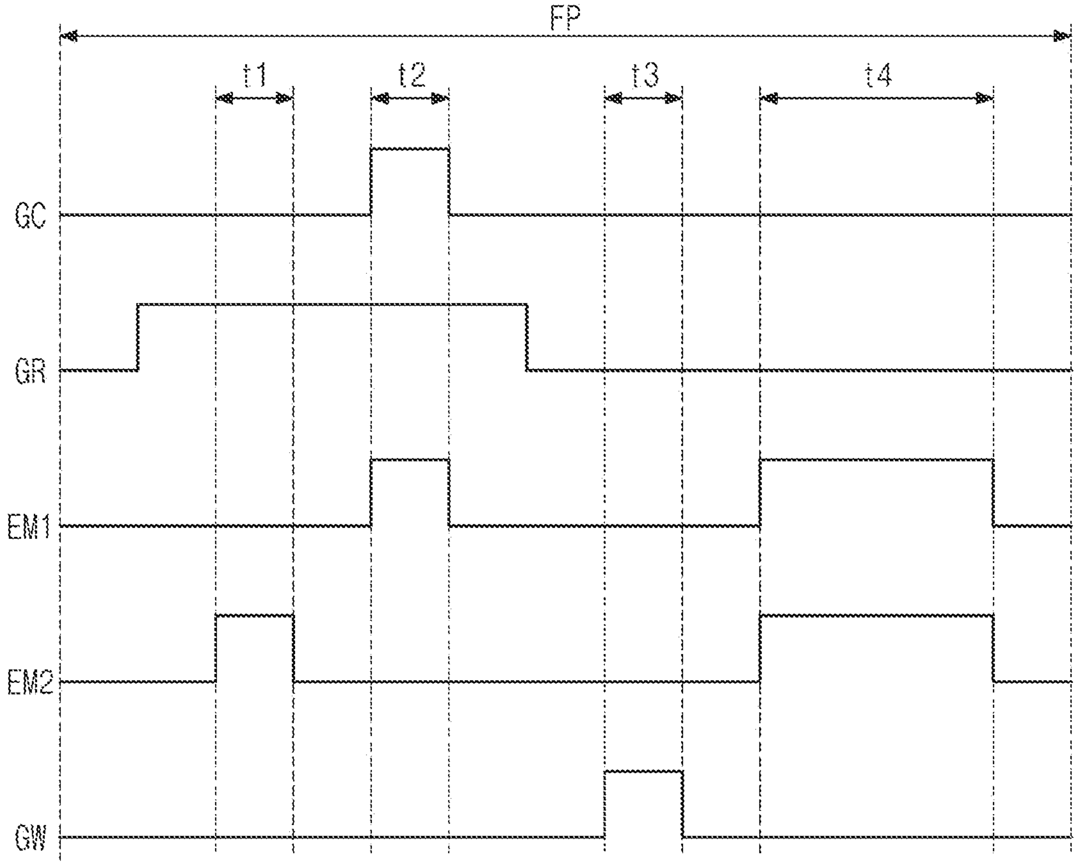
FIG. 4 is a timing diagram for describing an operation of a display device, according to some embodiments of the present disclosure.

FIG. 4 is a timing diagram for describing an operation of a display device, according to some embodiments of the present disclosure. FIGS. 5A to 5D are diagrams for describing an operation of a pixel, according to some embodiments of the present disclosure. In the description of FIGS. 5A to 5D, the same reference numerals are assigned to the same components described with reference to FIG. 3, and thus some repetitive descriptions thereof may be omitted to avoid or reduce redundancy.

Referring to FIG. 4, the display panel DP (see FIG. 2) may display the image IM (see FIG. 1) by operating in units of frame period FP. One frame period FP may include first to fourth periods t1, t2, t3, and t4. The first to third periods t1, t2, and t3 may be referred to as non-emission periods, and the fourth period t4 may be referred to as an emission period.

Figure 5A:
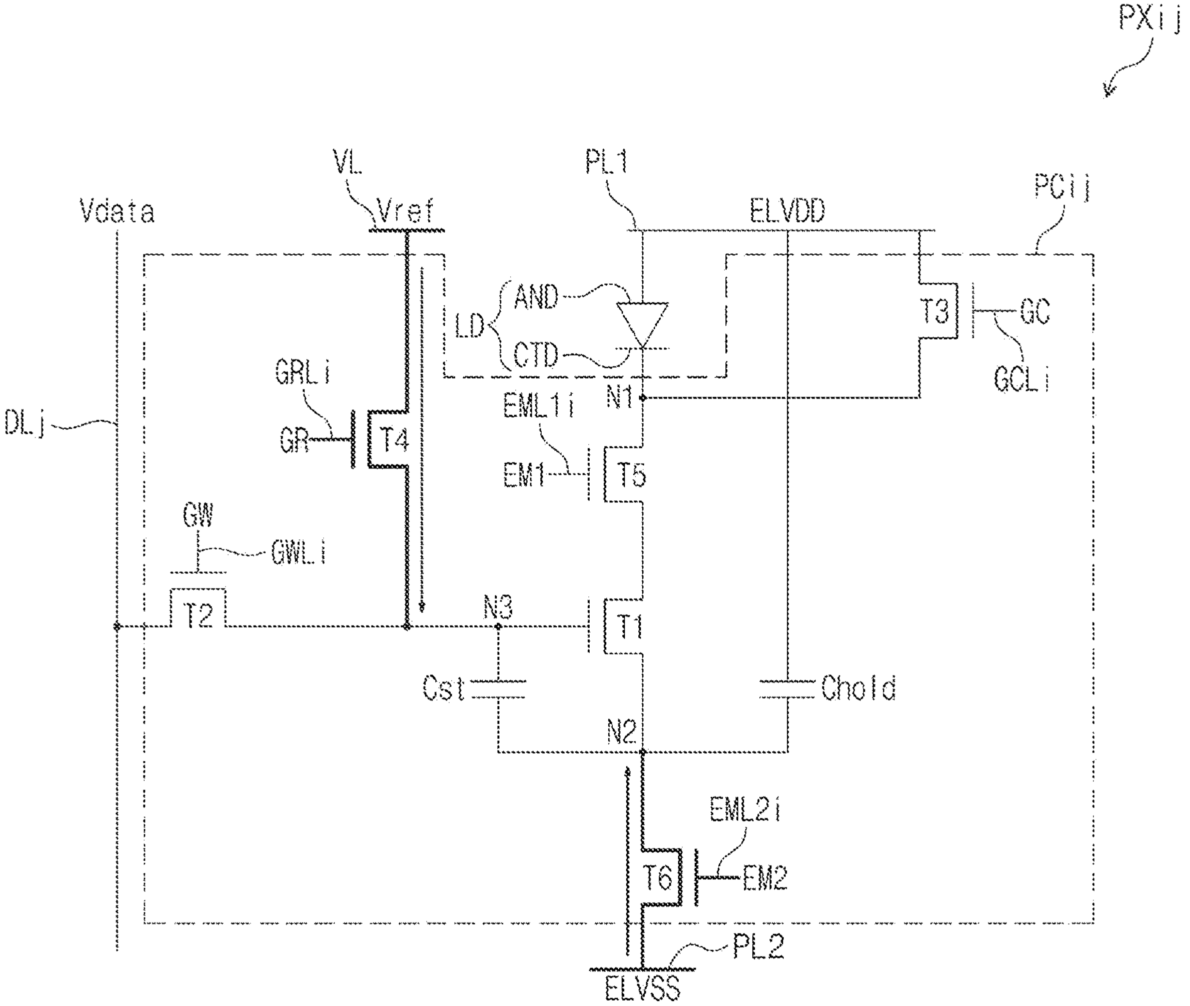
FIGS. 5A to 5D are diagrams for describing an operation of a pixel, according to some embodiments of the present disclosure.

FIG. 5A is a diagram for describing an operation of the pixel PXij in the first period t1 of the frame period FP.

Referring to FIGS. 4 and 5A, during the first period t1, each of the initialization scan signal GR and the second emission signal EM2 may be at an active level. An active level of each of the initialization scan signal GR and the second emission signal EM2 may be a high level.

Each of the compensation scan signal GC, the first emission signal EM1, and the scan signal GW may be at an inactive level. The inactive level of each of the compensation scan signal GC, the first emission signal EM1, and the scan signal GW may be a low level.

The fourth transistor T4 may be turned on in response to the initialization scan signal GR. The reference voltage Vref may be provided to the third node N3 through the fourth transistor T4.

During the first period t1, the gate electrode of the first transistor T1 may be initialized to the reference voltage Vref. That is, a voltage of the third node N3 may change from the data signal Vdata of a previous frame period to the reference voltage Vref.

The sixth transistor T6 may be turned on in response to the second emission signal EM2. The second power source ELVSS may be provided to the second node N2 through the sixth transistor T6.

During the first period t1, the source of the first transistor T1 may be initialized to the second power source ELVSS. The pixel PXij may initialize the source of the first transistor T1 through the second power source ELVSS without using a separate initialization voltage.

According to some embodiments of the present disclosure, the voltage generator 300 (see FIG. 2) may omit a separate power source line for supplying an initialization voltage to the second node N2. The area size of the non-display area NDA (see FIG. 1) may be reduced. Moreover, the number of power source lines included in the pixel PXij may be reduced. An interval between wires included in the pixel PXij may be increased. Signal interference between the wires may be relatively reduced. Accordingly, the pixel PXij with relatively improved display quality and the display device DD (see FIG. 1) including the same may be provided.

The first period t1 may be referred to as an "initialization period".

Figure 5B:
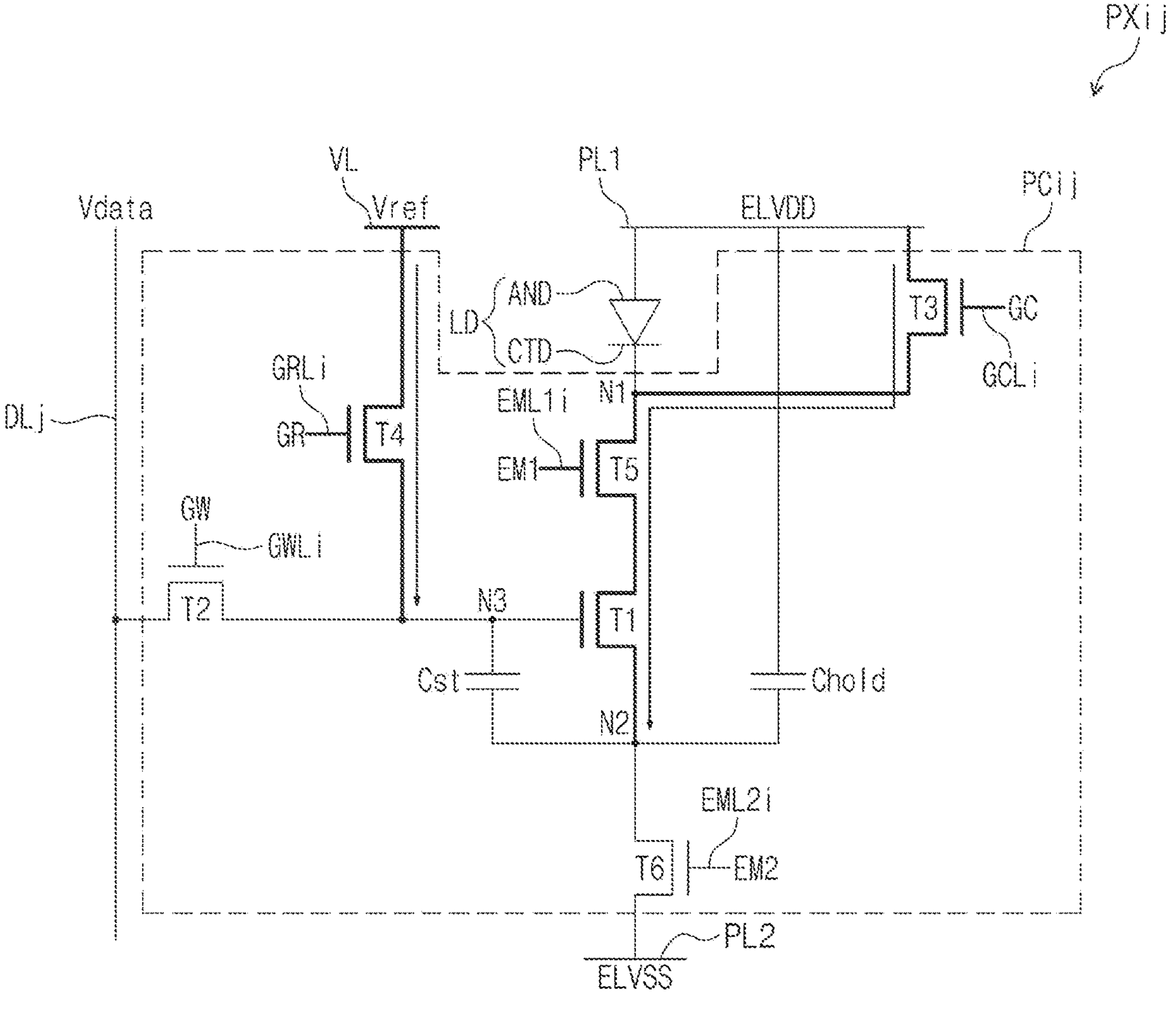

FIG. 5B is a diagram for describing an operation of the pixel PXij in the second period t2 of the frame period FP.

Referring to FIGS. 4 and 5B, during the second period t2, each of the compensation scan signal GC, the initialization scan signal GR, and the first emission signal EM1 may be at an active level. The active level of each of the compensation scan signal GC, the initialization scan signal GR, and the first emission signal EM1 may be a high level.

Each of the second emission signal EM2 and the scan signal GW may be at an inactive level. The inactive level of each of the second emission signal EM2 and the scan signal GW may be a low level.

The fourth transistor T4 may be turned on in response to the initialization scan signal GR. The reference voltage Vref may be provided to the third node N3 through the fourth transistor T4.

The third transistor T3 may be turned on in response to the compensation scan signal GC. The fifth transistor T5 may be turned on in response to the first emission signal EM1. The first transistor T1 may be turned on in response to the reference voltage Vref provided to the gate electrode.

As the third transistor T3 and the fifth transistor T5 are turned on, the first transistor T1 may operate as a source follower. A voltage (Vref−Vth) lower than the reference voltage Vref provided to the third node N3 by a threshold voltage (referred to as "Vth") of the first transistor T1 may be provided to the second node N2. That is, a voltage of "Vref−Vth" may be provided to the source of the first transistor T1.

The second capacitor Chold may be connected to the second node N2. One electrode of the second capacitor Chold may be connected to the first power source line PL1 receiving the first power source ELVDD, and the other electrode of the second capacitor Chold may be connected to the second node N2. The second capacitor Chold may store charges corresponding to a voltage difference (ELVDD−(Vref−Vth)) between the first power source ELVDD and the second node N2. The second capacitor Chold may be referred to as a "hold capacitor". The second capacitor Chold may have a higher storage capacity than the first capacitor Cst. The second capacitor Chold may minimize or reduce a voltage change of the second node N2 in response to a voltage change of the third node N3.

The second period t2 may be referred to as a "compensation period".

Figure 5C:
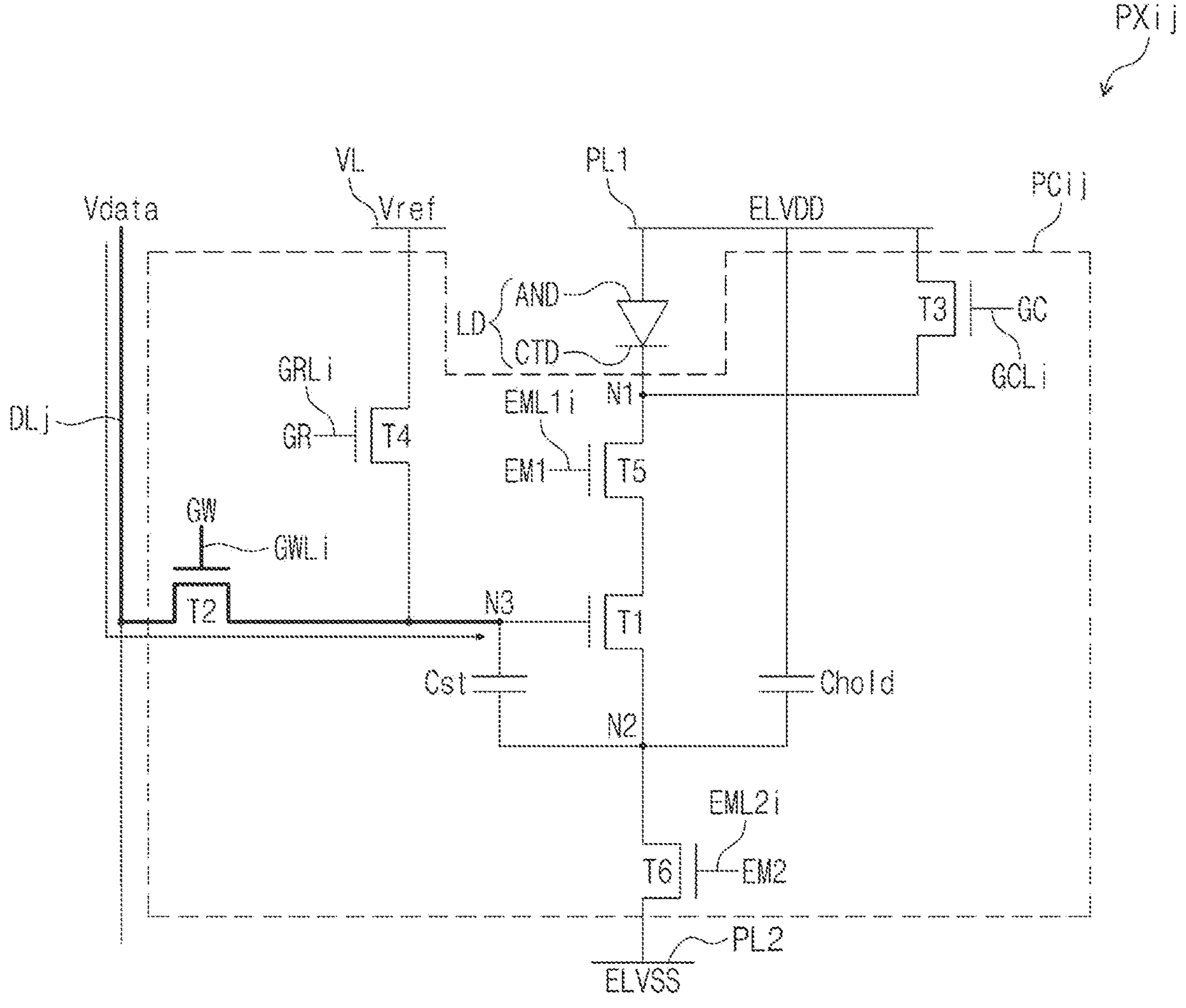

FIG. 5C is a diagram for describing an operation of the pixel PXij in the third period t3 of the frame period FP.

Referring to FIGS. 4 and 5C, during the third period t3, the scan signal GW may be at an active level. The active level of the scan signal GW may be a high level.

Each of the compensation scan signal GC, the initialization scan signal GR, the first emission signal EM1, and the second emission signal EM2 may be at an inactive level. The inactive level of each of the compensation scan signal GC, the initialization scan signal GR, the first emission signal EM1, and the second emission signal EM2 may be a low level.

The second transistor T2 may be turned on in response to the scan signal GW. The data signal Vdata provided through the data line DLj may be provided to the third node N3.

The first capacitor Cst may be positioned between the second node N2 and the third node N3. The first capacitor Cst may store a voltage difference between the second node N2 and the third node N3. A voltage level of one end (i.e., the third node N3) of the first capacitor Cst may be changed to a voltage level of the data signal Vdata. In this case, a voltage level of the other end (i.e., the second node N2) of the first capacitor Cst may be the voltage level of "Vref−Vth". The first capacitor Cst may store charges corresponding to a voltage difference (Vdata−(Vref−Vth)) between the third node N3 and the second node N2. The first capacitor Cst may be referred to as a "storage capacitor".

The third period t3 may be referred to as a "write period".

Figure 5D:
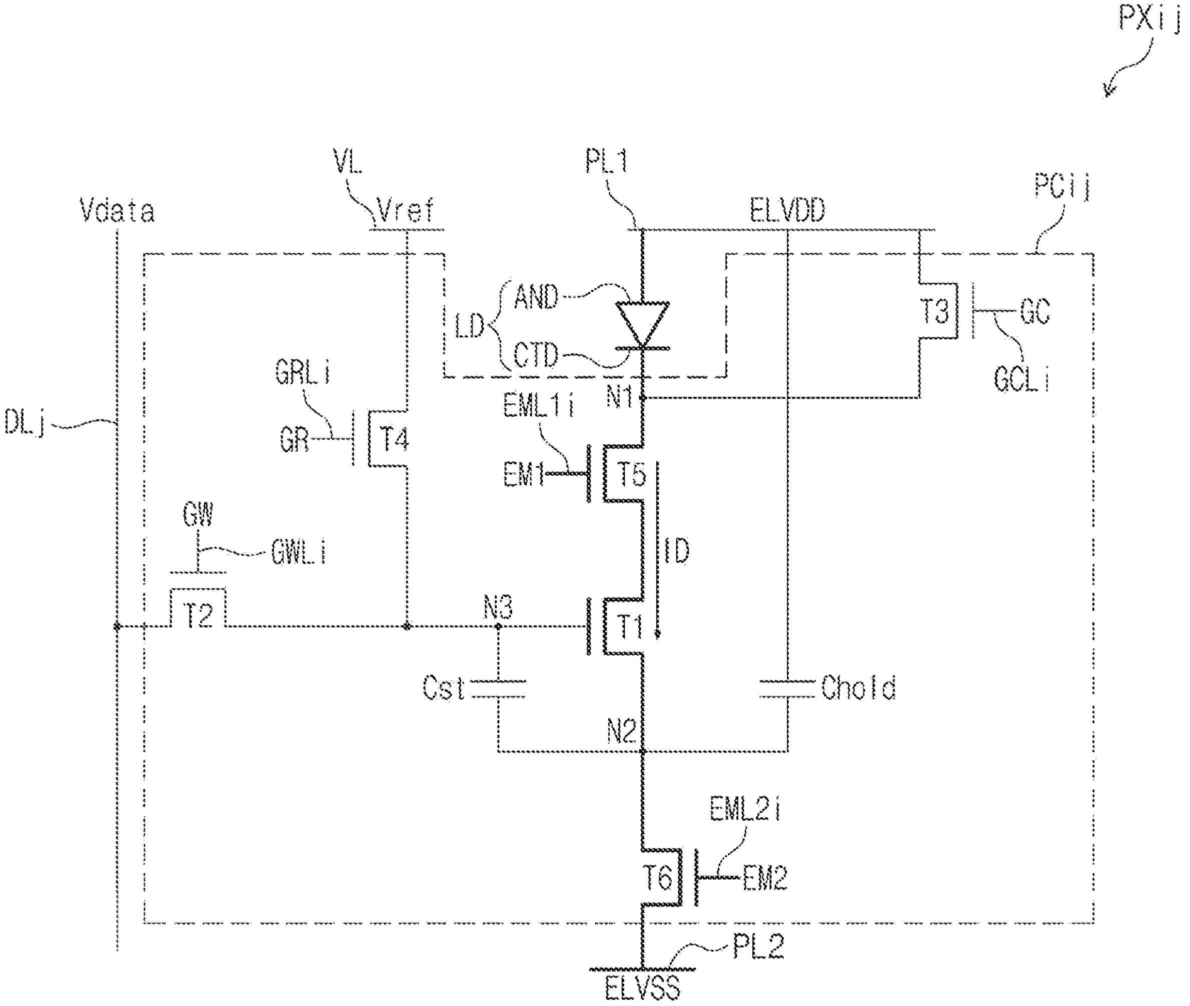

FIG. 5D is a diagram for describing an operation of the pixel PXij in the fourth period t4 of the frame period FP.

Referring to FIGS. 4 and 5D, during the fourth period t4, each of the first emission signal EM1 and the second emission signal EM2 may be at an active level. The active level of each of the first emission signal EM1 and the second emission signal EM2 may be a high level.

Each of the compensation scan signal GC, the initialization scan signal GR, and the scan signal GW may be at an inactive level. The inactive level of each of the compensation scan signal GC, the initialization scan signal GR, and the scan signal GW may be a low level.

The fifth transistor T5 may be turned on in response to the first emission signal EM1. The sixth transistor T6 may be turned on in response to the second emission signal EM2.

As the fifth transistor T5 and the sixth transistor T6 are turned on, a current path may be formed from the first power source line PL1 to the light emitting element LD, the fifth transistor T5, the first transistor T1, the sixth transistor T6, and the second power source line PL2. That is, a driving current Id may flow to the second power source ELVSS via the first power source line PL1, the light emitting element LD, the fifth transistor T5, the first transistor T1, and the sixth transistor T6, and the second power source line PL2.

A voltage level of the second power source ELVSS may be less than a value obtained by subtracting the threshold voltage Vth of the first transistor T1 from the reference voltage Vref.

Unlike some embodiments of the present disclosure, when the second power source ELVSS is greater than the value obtained by subtracting the threshold voltage Vth of the first transistor T1 from the reference voltage Vref, the current path may not be formed. However, according to some embodiments of the present disclosure, the second power source ELVSS may be less than the value obtained by subtracting the threshold voltage Vth of the first transistor T1 from the reference voltage Vref. The current path may be easily formed. The light emitting element LD may easily emit light. Accordingly, the pixel PXij with relatively improved display quality and the display device DD (see FIG. 1) including the same may be provided.

Data signals output from the data driving circuit 200 (see FIG. 2) of the display panel DP (see FIG. 2) are written, and thus the light emitting element LD may emit light. The driving current Id may be expressed by the following equations.

$$Id = \frac{1}{2} \cdot \mu \cdot Cox \cdot \frac{W}{L}(Vgs - Vth)^2 \quad \text{Equation 1}$$

$$Vgs = [(Vdata) + (ELVSS - (Vref - Vth))] \quad \text{Equation 2}$$

$$Id = \frac{1}{2} \cdot \mu \cdot Cox \cdot \frac{W}{L}[(Vdata + ELVSS - Vref + Vth) - ELVSS - Vth]^2 \quad \text{Equation 3}$$

$$Id = \frac{1}{2} \cdot \mu \cdot Cox \cdot \frac{W}{L}(Vdata - Vref)^2 \quad \text{Equation 4}$$

In Equations 1 to 4, u may denote electric field mobility; Cox may denote the capacitance of a gate insulating film; W/L may denote the width and length of the first transistor T1; and, Vgs may denote a gate-source voltage of the first transistor T1. μ and Cox may be constants. Equation 4 may be a summary of Equation 3 obtained by reflecting Equation 2 to Equation 1.

The threshold voltage Vth of the first transistor T1 included in each of the pixels PX (see FIG. 2) may be different depending on characteristics of the first transistor T1. However, according to some embodiments of the present disclosure, the threshold voltage Vth of the first transistor T1 may not affect the driving current Id flowing through the light emitting element LD by the first to fourth steps t1, t2, t3, and t4. Referring to Equation 4, during the fourth period t4, the driving current Id flowing to the light emitting element LD may not be affected by the threshold voltage Vth of the first transistor T1. The light emitting element LD may be proportional to the square of a difference between the data signal Vdata and the reference voltage Vref regardless of characteristics of the first transistor T1. Accordingly, the luminance of the image IM (see FIG. 1) output from the display panel DP (see FIG. 2) may be maintained uniformly. Accordingly, the pixel PXij with relatively improved display quality and the display device DD (see FIG. 1) including the same may be provided.

Furthermore, a voltage level of the second power source ELVSS in the second power source line PL2 may be changed by a voltage drop (referred to as "IR drop"). However, according to some embodiments of the present disclosure, the second power source ELVSS may not affect the driving current Id flowing through the light emitting element LD by the first to fourth steps t1, t2, t3, and t4. Referring to Equation 4, during the fourth period t4, the driving current Id flowing to the light emitting element LD may not be affected by the second power source ELVSS. The light emitting element LD may be proportional to the square of a difference between the data signal Vdata and the reference voltage Vref regardless of the voltage level of the second power source ELVSS. Accordingly, the luminance of the image IM (see FIG. 1) output from the display panel DP (see FIG. 2) may be maintained uniformly. Accordingly, the pixel PXij with relatively improved display quality and the display device DD (see FIG. 1) including the same may be provided.

Moreover, according to some embodiments of the present disclosure, the first transistor T1 may be an N-type transistor, and the cathode CTD of the light emitting element LD may be electrically connected to a drain of the first transistor T1. In this case, even though the light emitting element LD deteriorates, a voltage of a source terminal of the first transistor T1, which affects the driving current Id, may not shift. That is, even when the light emitting element LD deteriorates, the gate-source voltage Vgs of the first transistor T1 may not change. Accordingly, because the range of a change in the amount of current flowing through the first transistor T1 is reduced even when the usage time increases, the afterimage defect (or poor long-term afterimage) of the display panel DP (see FIG. 2) may be relatively reduced and the lifespan of the display panel DP (see FIG. 2) may be relatively improved. Accordingly, the pixel PXij with relatively improved display quality and the display device DD (see FIG. 1) including the same may be provided.

The fourth period t4 may be referred to as an “emission period”.

Figure 6A:
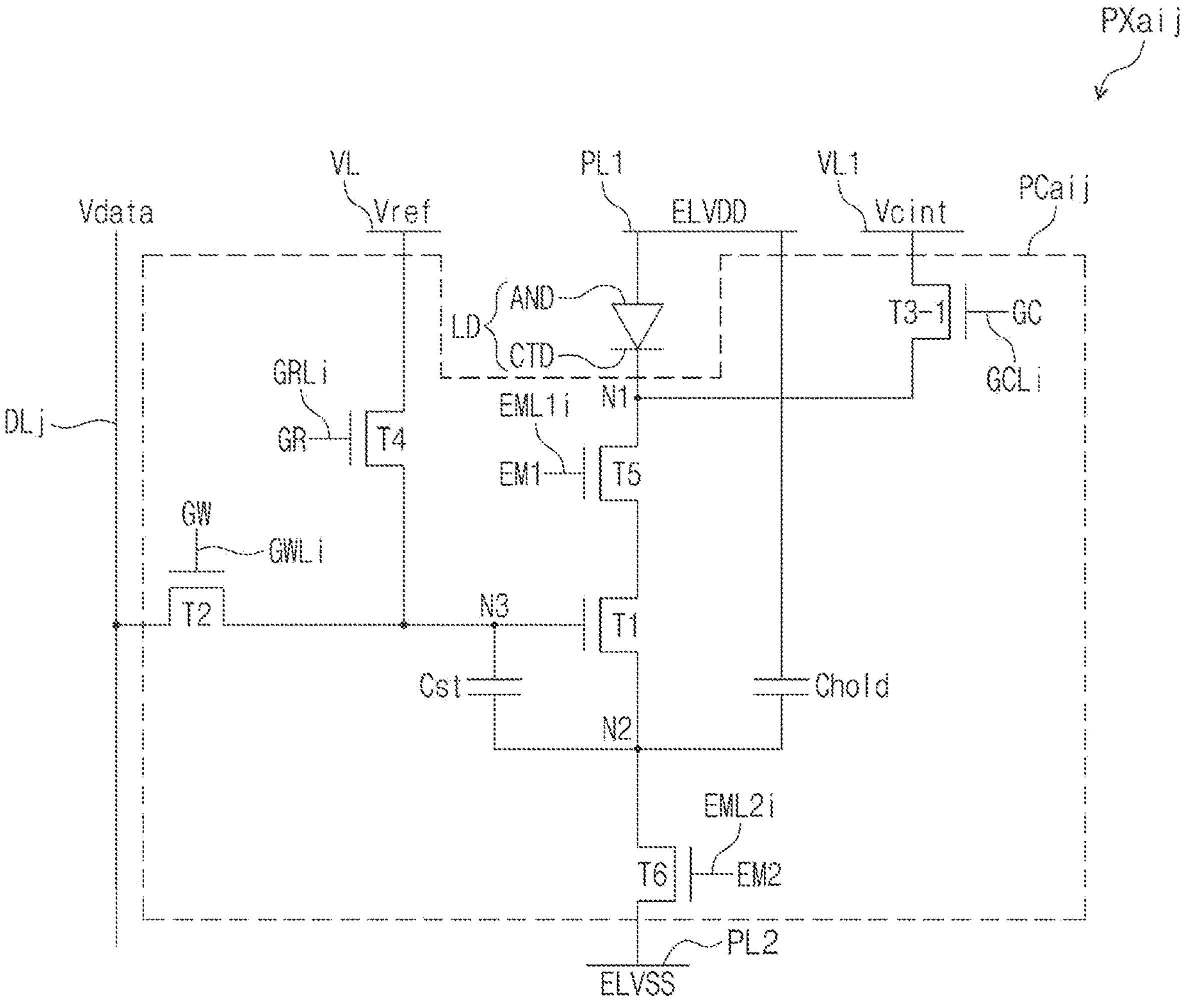
FIG. 6A is an equivalent circuit diagram of a pixel, according to some embodiments of the present disclosure.

FIG. 6A is an equivalent circuit diagram of a pixel, according to some embodiments of the present disclosure. In the description of FIG. 6A, the same reference numerals are assigned to the same components described with reference to FIG. 3, and thus some repetitive descriptions thereof may be omitted to avoid or reduce redundancy.

Referring to FIG. 6A, a pixel PXaij may include the light emitting element LD and a pixel driving circuit PCaij.

The pixel driving circuit PCaij may include first to sixth transistors T1, T2, T3-1, T4, T5, and T6 and the capacitors Cst and Chold.

The first electrode of the third transistor T3-1 may be electrically connected to a first initialization voltage line VL1. A first initialization voltage Vcint may be provided to the first initialization voltage line VL1.

The first initialization voltage Vcint may be greater than a value obtained by subtracting the threshold voltage Vth of the first transistor T1 from the reference voltage Vref.

Unlike some embodiments of the present disclosure, when the first initialization voltage Vcint is less than the value obtained by subtracting the threshold voltage Vth of the first transistor T1 from the reference voltage Vref, the voltage of “Vref–Vth” may not be provided to the second node N2 during the second period t2 (see FIG. 4). The source of the first transistor T1 may not be compensated. However, according to some embodiments of the present disclosure, the first initialization voltage Vcint may be greater than the value obtained by subtracting the threshold voltage Vth of the first transistor T1 from the reference voltage Vref. During the second period t2 (see FIG. 4), the source of the first transistor T1 may be relatively easily compensated. Accordingly, it is possible to provide the pixel PXaij with relatively improved reliability and the display device DD (see FIG. 1) including the same.

The first initialization voltage Vcint may be greater than the value obtained by subtracting the threshold voltage Vth of the first transistor T1 from the first power source ELVDD.

Unlike some embodiments of the present disclosure, when the first initialization voltage Vcint is less than the value obtained by subtracting the threshold voltage Vth of the first transistor T1 from the first power source ELVDD, a current path may be formed through the first power source line PL1, the light emitting element LD, the third transistor T3-1, and the first initialization voltage line VL1 during the second period t2 (see FIG. 4) such that the light emitting element LD is capable of emitting light. However, according to some embodiments of the present disclosure, the first initialization voltage Vcint may be greater than the value obtained by subtracting the threshold voltage Vth of the first transistor T1 from the first power source ELVDD. It may be possible to prevent or reduce instances of the light emitting element LD unnecessarily emitting light during the second period t2 (see FIG. 4). Accordingly, it may be possible to provide the pixel PXaij with relatively improved reliability and the display device DD (see FIG. 1) including the same.

Figure 6B:
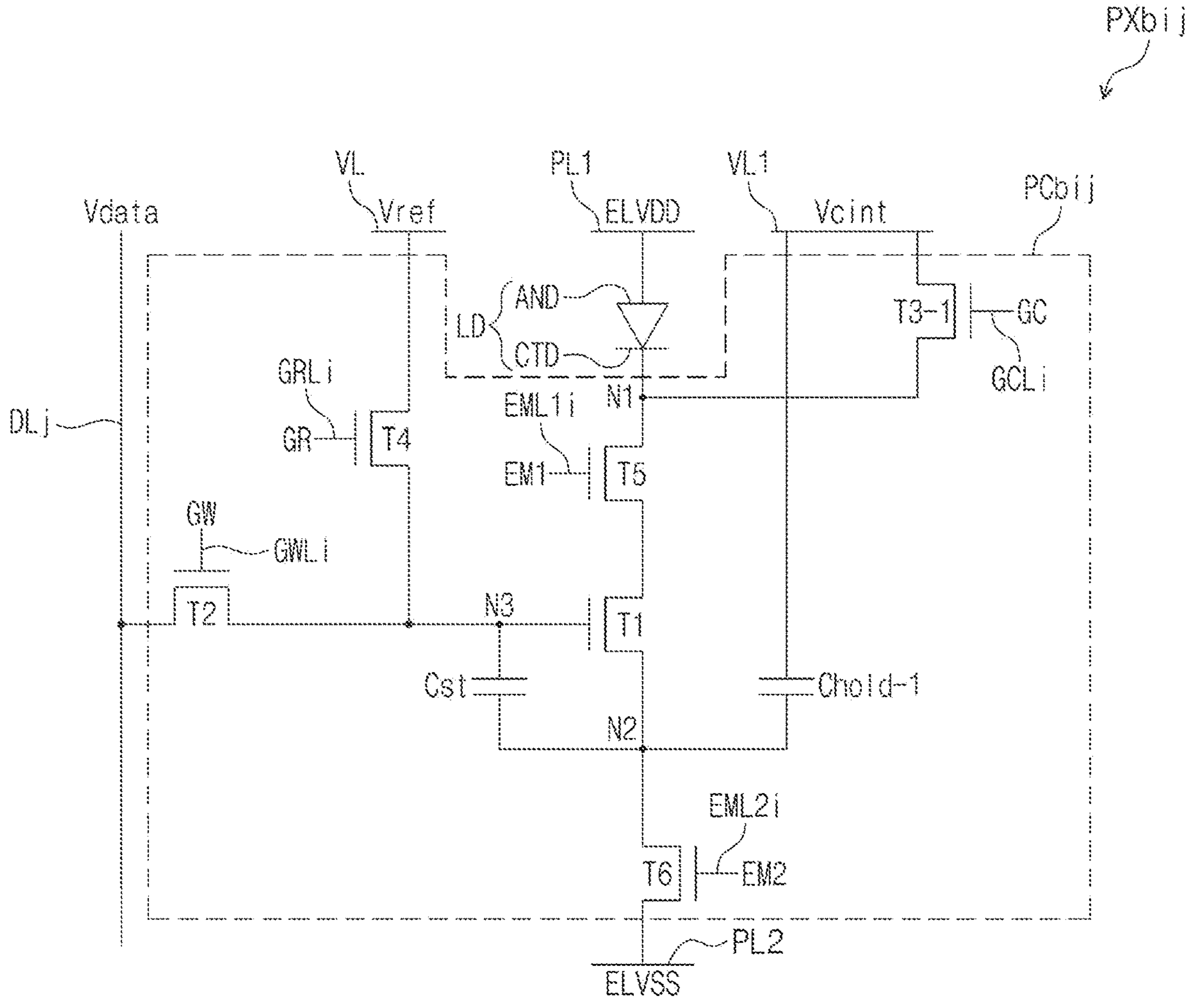
FIG. 6B is an equivalent circuit diagram of a pixel, according to some embodiments of the present disclosure.

FIG. 6B is an equivalent circuit diagram of a pixel, according to some embodiments of the present disclosure. In the description of FIG. 6B, the same reference numerals are assigned to the same components described with reference to FIG. 3, and thus some repetitive descriptions thereof may be omitted to avoid or reduce redundancy.

Referring to FIG. 6B, a pixel PXbij may include the light emitting element LD and a pixel driving circuit PCbij.

The pixel driving circuit PCbij may include first to sixth transistors T1, T2, T3-1, T4, T5, and T6 and capacitors Cst and Chold-1.

The first electrode of the third transistor T3-1 may be electrically connected to a first initialization voltage line VL1. A first initialization voltage Vcint may be provided to the first initialization voltage line VL1.

The first initialization voltage Vcint may be greater than a value obtained by subtracting the threshold voltage Vth of the first transistor T1 from the reference voltage Vref.

The first initialization voltage Vcint may be greater than the value obtained by subtracting the threshold voltage Vth of the first transistor T1 from the first power source ELVDD.

The 2-1st capacitor Chold-1 may be connected between the first initialization voltage line VL1 and the second node N2. One electrode of the 2-1st capacitor Chold-1 may be connected to the first initialization voltage line VL1, which is supplied with the first initialization voltage Vcint, and the other electrode of the 2-1st capacitor Chold-1 may be connected to the second node N2. The 2-1st capacitor Chold-1 may store charges corresponding to a voltage difference between the first initialization voltage Vcint and the second node N2. The 2-1st capacitor Chold-1 may minimize or reduce a voltage change of the second node N2 in response to a voltage change of the third node N3.

Figure 6C:
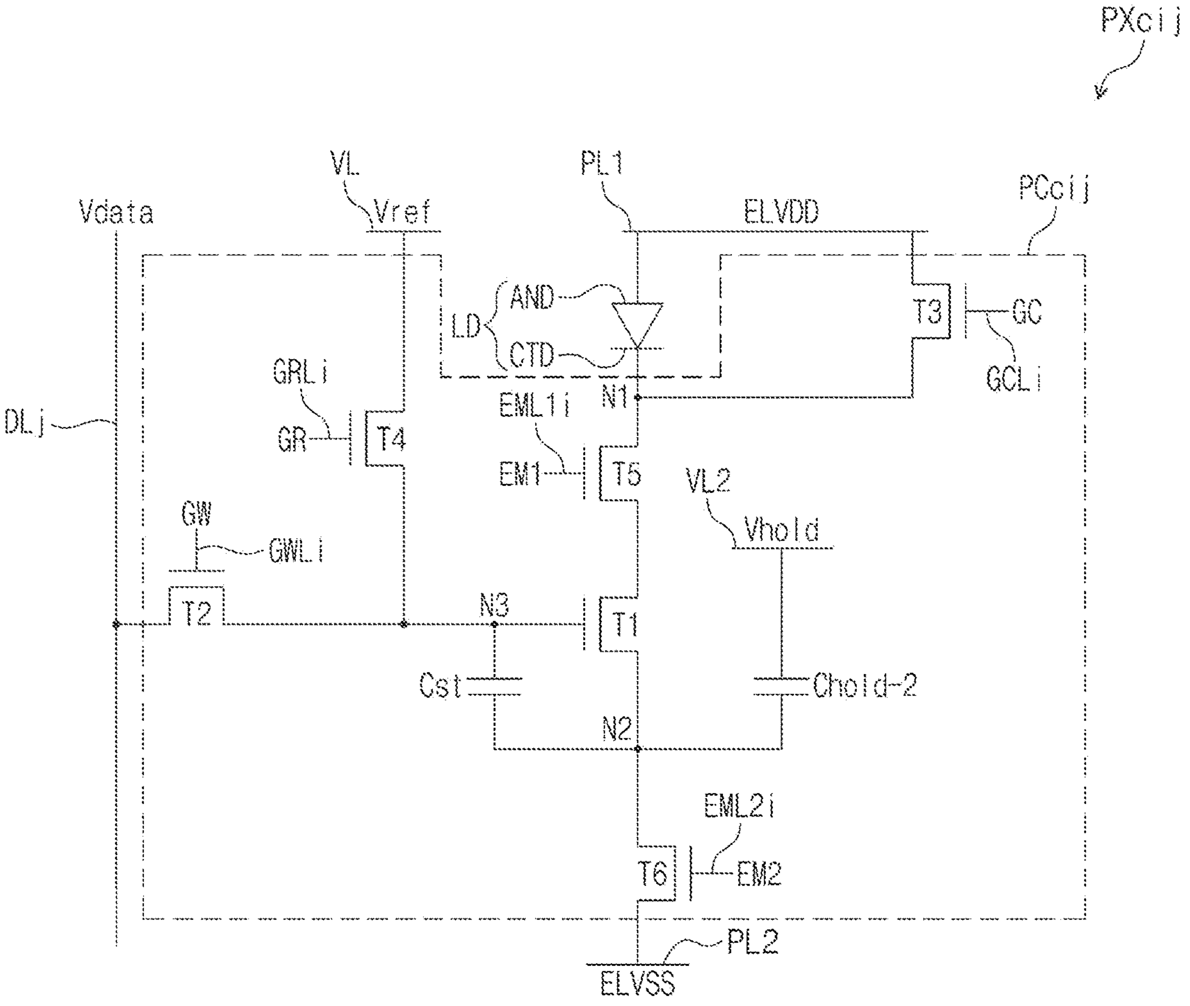
FIG. 6C is an equivalent circuit diagram of a pixel, according to some embodiments of the present disclosure.

FIG. 6C is an equivalent circuit diagram of a pixel, according to some embodiments of the present disclosure. In the description of FIG. 6C, the same reference numerals are assigned to the same components described with reference to FIG. 3, and thus some repetitive descriptions thereof may be omitted to avoid or reduce redundancy.

Referring to FIG. 6C, a pixel PXcij may include the light emitting element LD and a pixel driving circuit PCcij.

The pixel driving circuit PCcij may include first to sixth transistors T1, T2, T3, T4, T5, and T6 and capacitors Cst and Chold-2.

The 2-2nd capacitor Chold-2 may be connected between a second initialization voltage line VL2 and the second node N2. One electrode of the 2-2nd capacitor Chold-2 may be connected to the second initialization voltage line VL2, which is supplied with a second initialization voltage Vhold, and the other electrode of the 2-2nd capacitor Chold-2 may be connected to the second node N2. The 2-2nd capacitor Chold-2 may store charges corresponding to a voltage difference between the second initialization voltage Vhold and the second node N2. The 2-2nd capacitor Chold-2 may minimize or reduce a voltage change of the second node N2 in response to a voltage change of the third node N3.

The reference voltage Vref, the second power source ELVSS, a ground voltage, and the like may be provided as the second initialization voltage Vhold. However, this is an example. For example, the second initialization voltage Vhold according to some embodiments of the present disclosure is not limited thereto and may be provided in various ways. For example, the second initialization voltage Vhold may have a different voltage level from the reference voltage Vref, the second power source ELVSS, and the ground voltage generated by the voltage generator 300 (see FIG. 2).

Figure 6D:
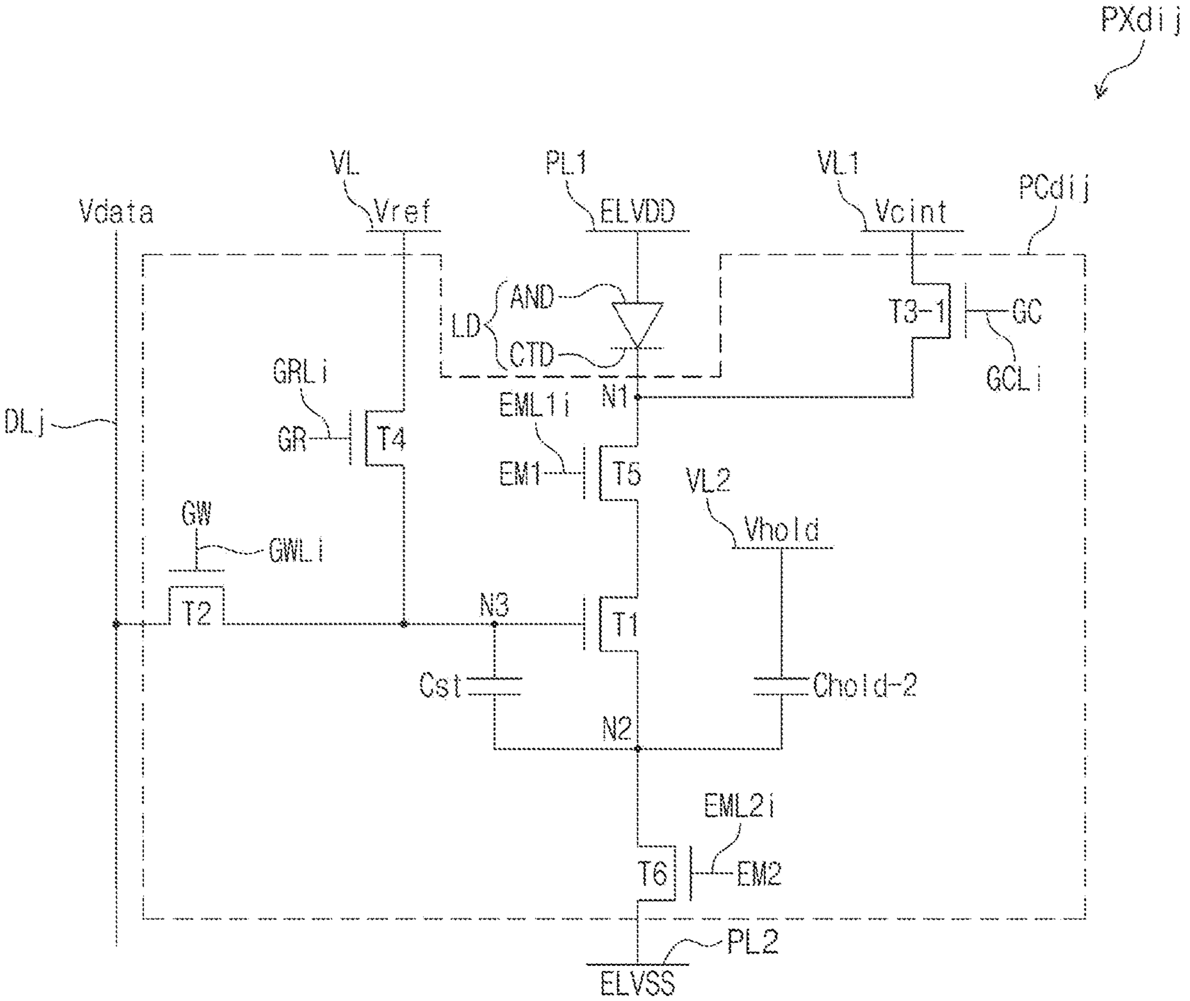
FIG. 6D is an equivalent circuit diagram of a pixel, according to some embodiments of the present disclosure.

FIG. 6D is an equivalent circuit diagram of a pixel, according to some embodiments of the present disclosure. In the description of FIG. 6D, the same reference numerals are assigned to the same components described with reference to FIG. 3, and thus some repetitive descriptions thereof may be omitted to avoid or reduce redundancy.

Referring to FIG. 6D, a pixel PXdij may include the light emitting element LD and a pixel driving circuit PCdij.

The pixel driving circuit PCdij may include first to sixth transistors T1, T2, T3-1, T4, T5, and T6 and capacitors Cst and Chold-2.

The first electrode of the third transistor T3-1 may be electrically connected to a first initialization voltage line VL1. A first initialization voltage Vcint may be provided to the first initialization voltage line VL1.

The first initialization voltage Vcint may be greater than a value obtained by subtracting the threshold voltage Vth of the first transistor T1 from the reference voltage Vref.

The first initialization voltage Vcint may be greater than the value obtained by subtracting the threshold voltage Vth of the first transistor T1 from the first power source ELVDD.

The 2-2nd capacitor Chold-2 may be connected between a second initialization voltage line VL2 and the second node N2. One electrode of the 2-2nd capacitor Chold-2 may be connected to the second initialization voltage line VL2, which is supplied with a second initialization voltage Vhold, and the other electrode of the 2-2nd capacitor Chold-2 may be connected to the second node N2. The 2-2nd capacitor Chold-2 may store charges corresponding to a voltage difference between the second initialization voltage Vhold and the second node N2. The 2-2nd capacitor Chold-2 may minimize or reduce a voltage change of the second node N2 in response to a voltage change of the third node N3.

The second initialization voltage Vhold may have a different voltage level from the first initialization voltage Vcint.

Figure 6E:
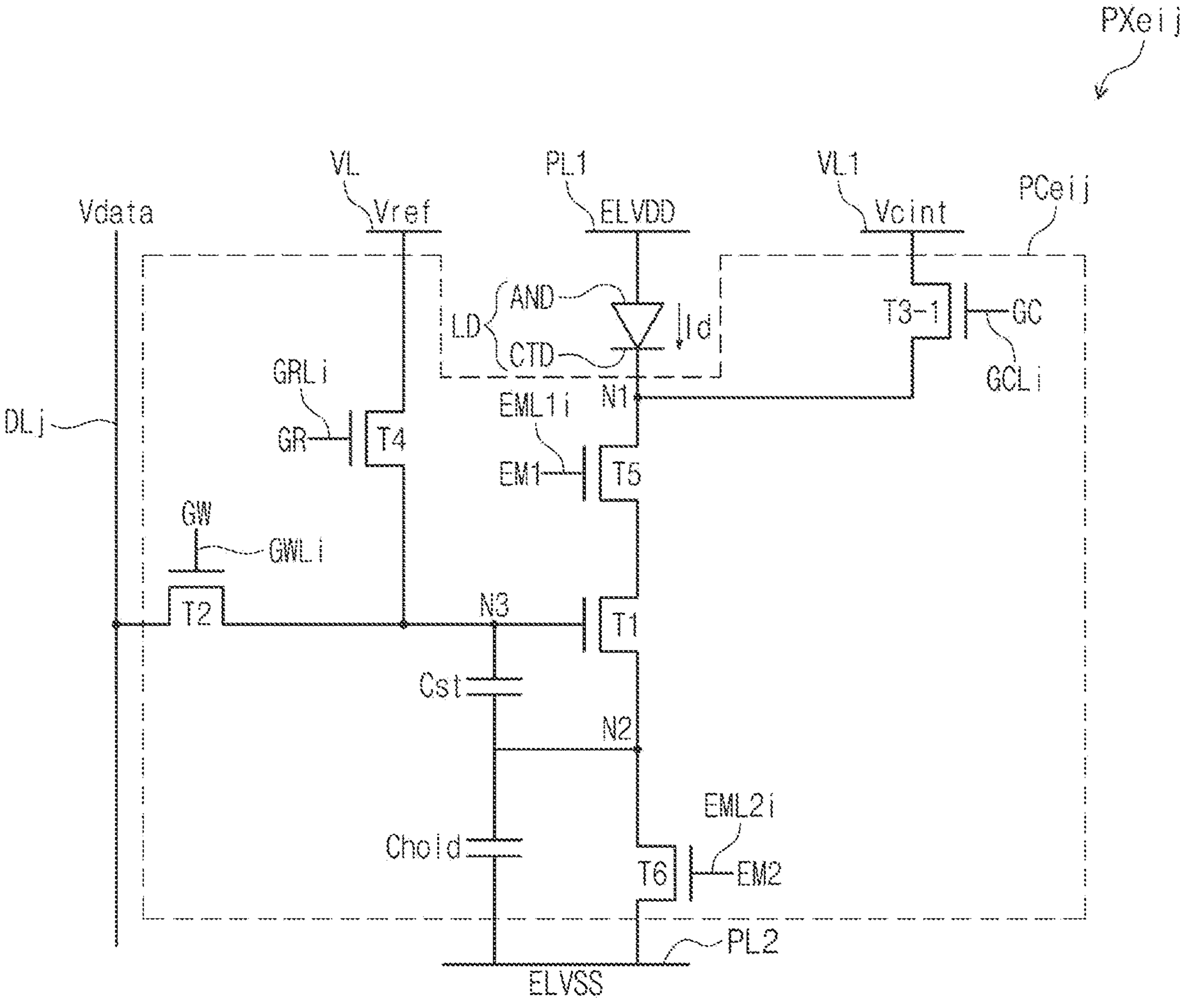
FIG. 6E is an equivalent circuit diagram of a pixel, according to some embodiments of the present disclosure.

FIG. 6E is an equivalent circuit diagram according to an embodiment of the present invention. In describing FIG. 6E, the same reference numerals are assigned to the same components described with reference to FIG. 6D and thus some repetitive descriptions thereof may be omitted to avoid or reduce redundancy.

Referring to FIG. 6E, a pixel PXeij may include a second capacitor Chold. The second capacitor Chold may be connected between the second node N2 and the second power line PL2.

Figure 7:
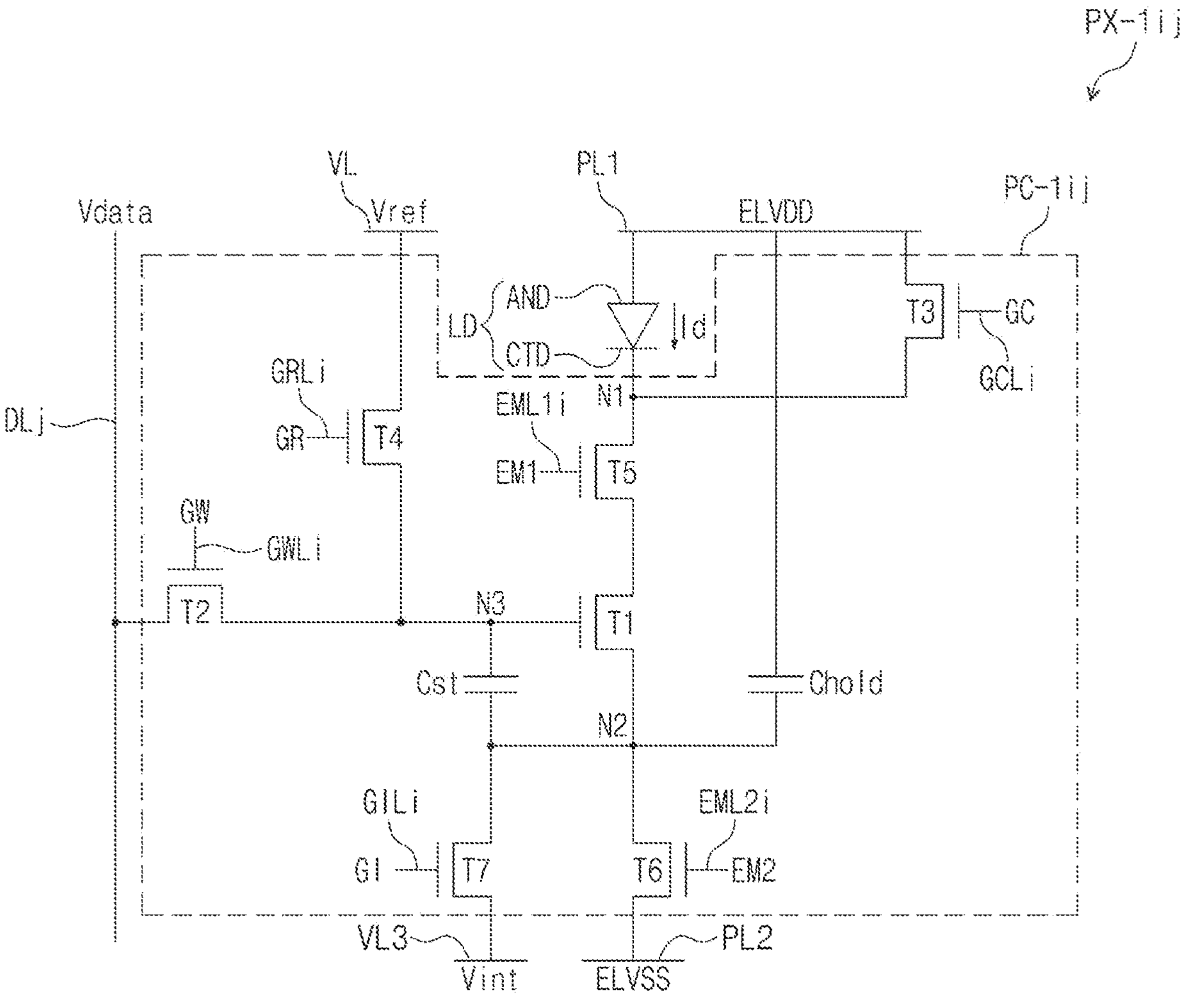
FIG. 7 is an equivalent circuit diagram of a pixel according to some embodiments of the present disclosure.

FIG. 7 is an equivalent circuit diagram of a pixel according to some embodiments of the present disclosure. In the description of FIG. 7, the same reference numerals are assigned to the same components described with reference to FIG. 3, and thus some the descriptions thereof may be omitted to avoid or reduce redundancy.

Referring to FIG. 7, a pixel PX-1*ij* may include the light emitting element LD and a pixel driving circuit PC-1*ij*.

The pixel driving circuit PC-1*ij* may include first to seventh transistors T1, T2, T3, T4, T5, T6, and T7 and the capacitors Cst and Chold.

The seventh transistor T7 may be an N-type transistor having an oxide semiconductor as a semiconductor layer. The seventh transistor T7 may include a first electrode electrically connected to the second node N2, a second electrode electrically connected to a third initialization voltage line VL3 through which a third initialization voltage Vint is provided, and a gate electrode receiving the input scan signal GI. The gate electrode may be connected to the input scan line GILi.

Figure 8:
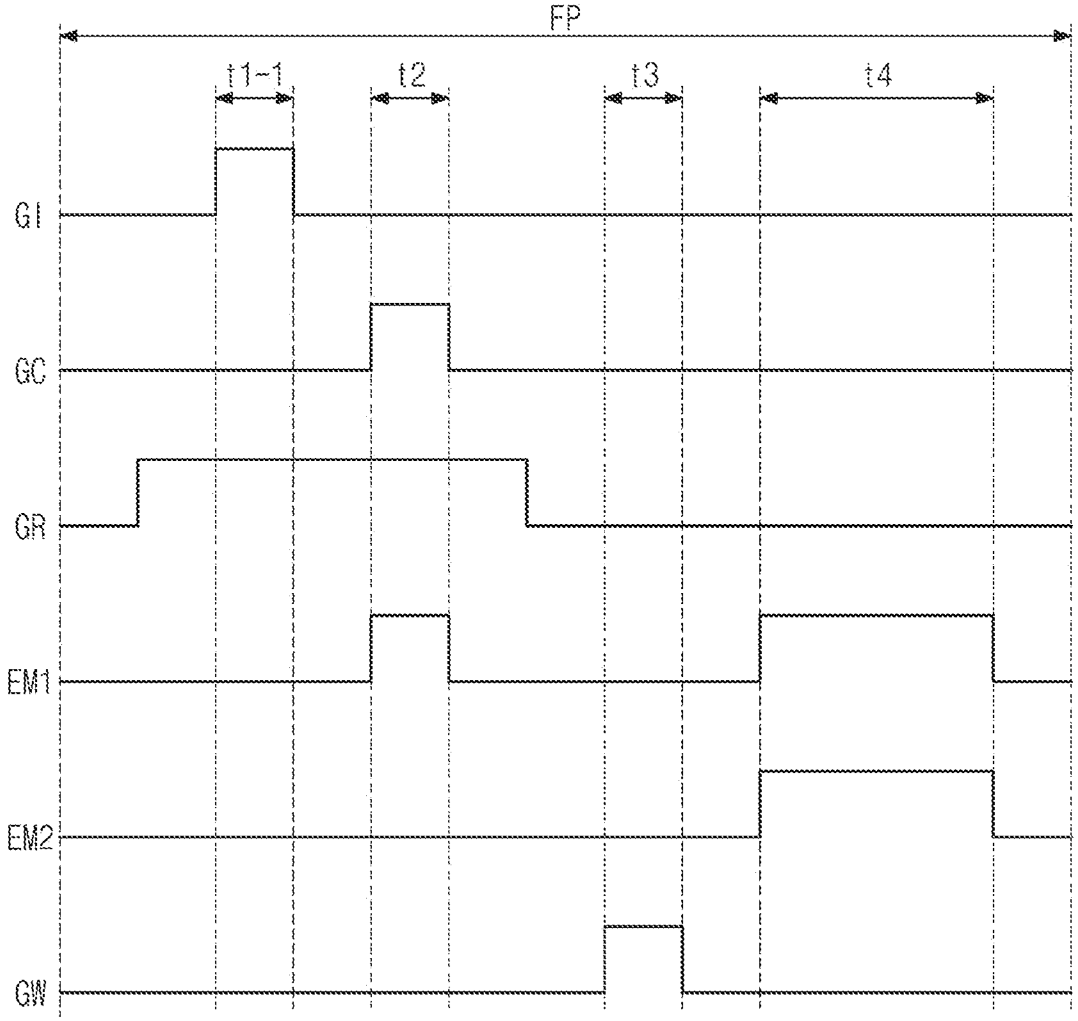
FIG. 8 is a timing diagram for describing an operation of a display device, according to some embodiments of the present disclosure.
Figure 9:
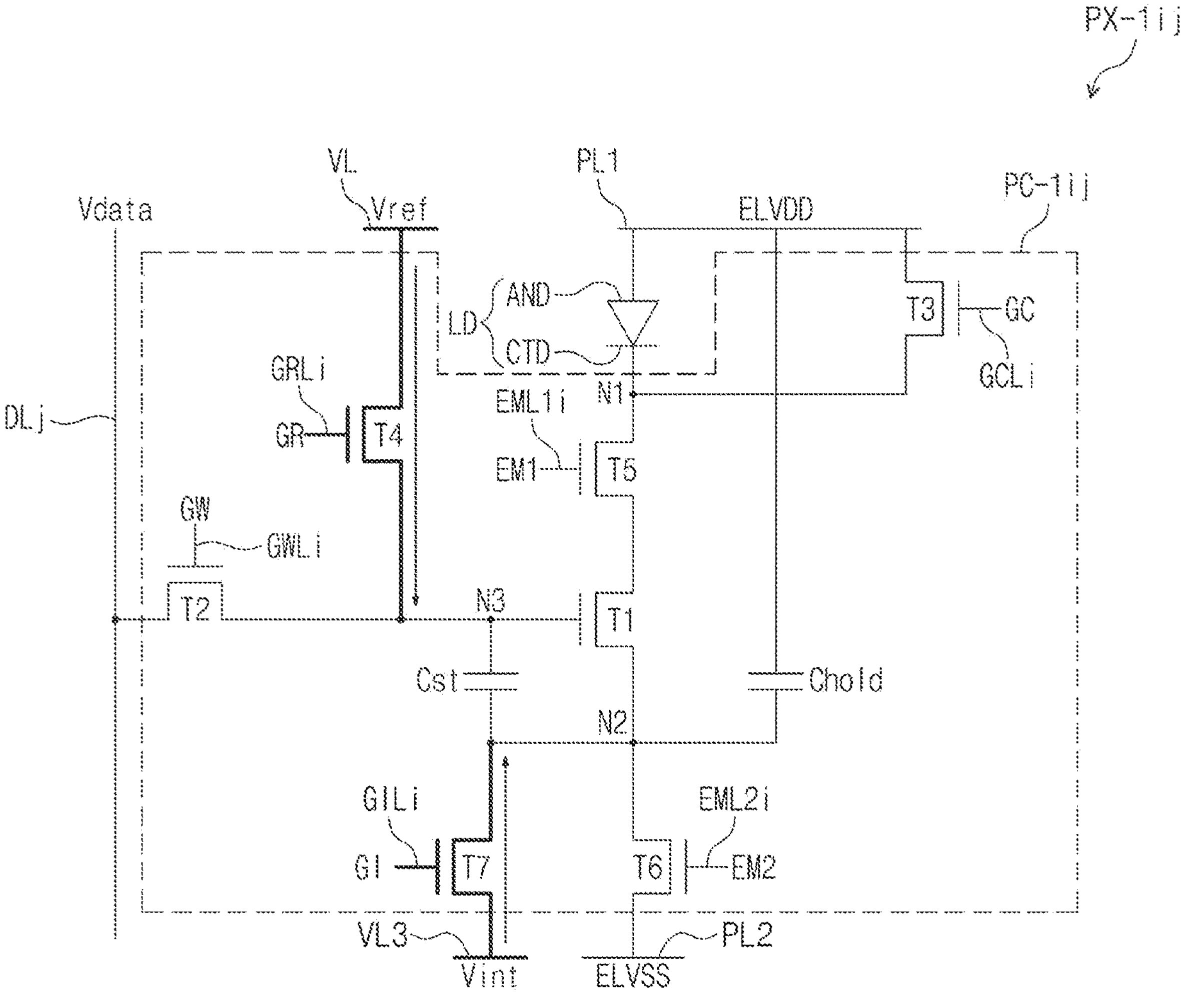
FIG. 9 is a diagram for describing an operation of a pixel, according to some embodiments of the present disclosure.

FIG. 8 is a timing diagram for describing an operation of a display device, according to some embodiments of the present disclosure. FIG. 9 is a diagram for describing an operation of a pixel, according to some embodiments of the present disclosure. In the description of FIG. 8, the same reference numerals are assigned to the same components described with reference to FIG. 4, and thus some repetitive descriptions thereof may be omitted to avoid or reduce redundancy. In the description of FIG. 9, the same reference numerals are assigned to the same components described with reference to FIG. 7, and thus some repetitive descriptions thereof may be omitted to avoid or reduce redundancy.

Referring to FIG. 8, one frame period FP may include first to fourth periods t1-1, t2, t3, and t4. The first to third periods t1-1, t2, and t3 may be referred to as non-emission periods, and the fourth period t4 may be referred to as an emission period.

FIG. 9 is a diagram for describing an operation of a pixel during the first period t1-1.

Referring to FIGS. 8 and 9, during the first period t1-1, the initialization scan signal GR and the input scan signal GI may be at an active level. An active level of each of the initialization scan signal GR and the input scan signal GI may be a high level.

Each of the compensation scan signal GC, the first emission signal EM1, the second emission signal EM2, and the scan signal GW may be at an inactive level. The inactive level of each of the compensation scan signal GC, the first emission signal EM1, the second emission signal EM2, and the scan signal GW may be a low level.

The fourth transistor T4 may be turned on in response to the initialization scan signal GR. The reference voltage Vref may be provided to the third node N3 through the fourth transistor T4.

During the first period t1-1, the gate electrode of the first transistor T1 may be initialized to the reference voltage Vref. That is, a voltage of the third node N3 may change from the data signal Vdata of a previous frame to the reference voltage Vref.

The seventh transistor T7 may be turned on in response to the input scan signal GI. The third initialization voltage Vint may be provided to the second node N2 through the seventh transistor T7.

According to some embodiments of the present disclosure, a voltage drop (IR drop) may not occur in the third initialization voltage Vint provided by the voltage generator 300 (see FIG. 2). The third initialization voltage Vint may have a stable voltage value compared to the second power source ELVSS. Accordingly, the pixel PXij with relatively improved reliability and the display device DD (see FIG. 1) including the same may be provided.

A voltage level of the third initialization voltage Vint may be less than a value obtained by subtracting the threshold voltage Vth of the first transistor T1 from the reference voltage Vref. For example, a voltage value of the third initialization voltage Vint may be the same as a voltage value of the second power source ELVSS.

Figure 10A:
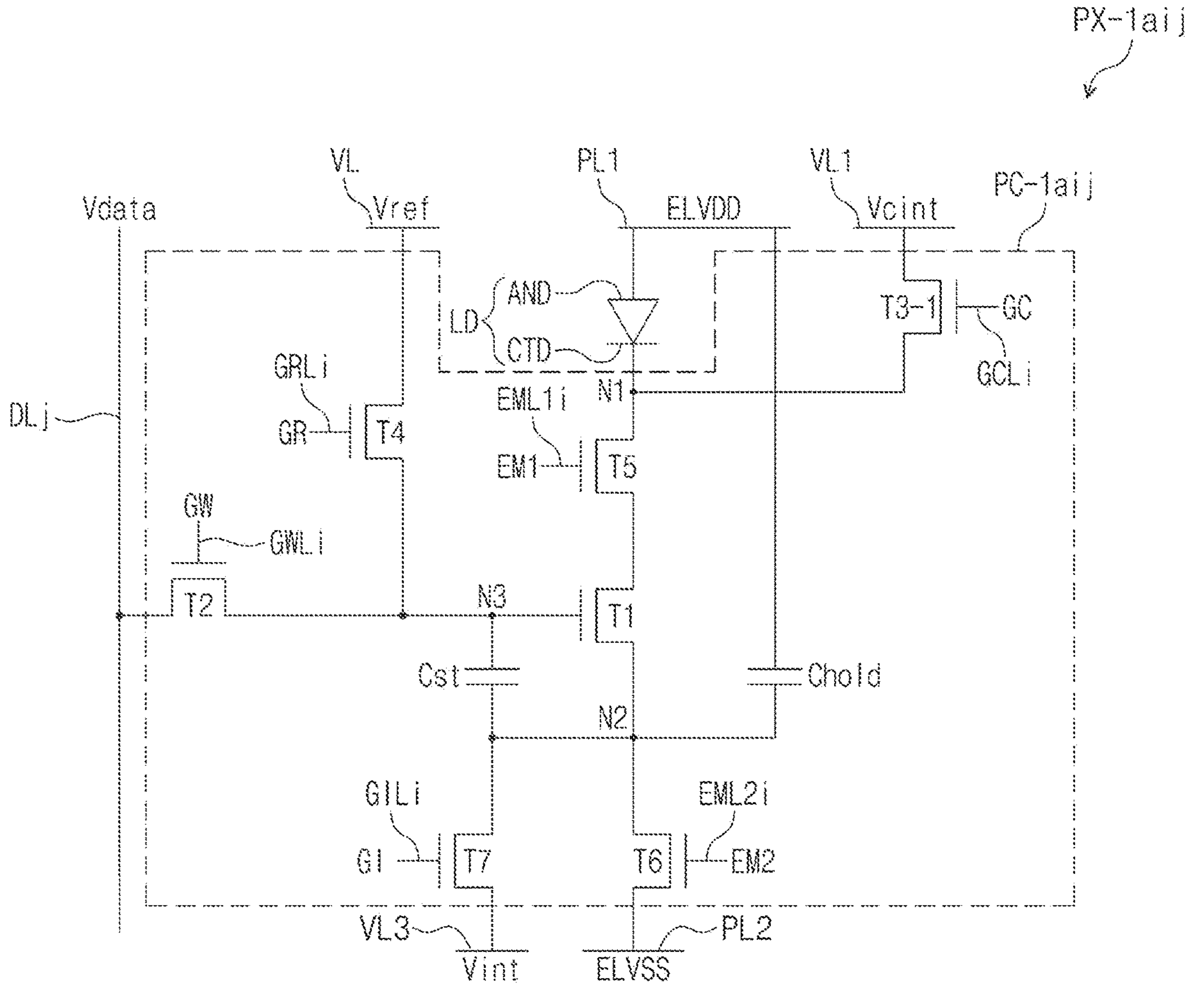
FIG. 10A is an equivalent circuit diagram of a pixel, according to some embodiments of the present disclosure.

FIG. 10A is an equivalent circuit diagram of a pixel, according to some embodiments of the present disclosure. In the description of FIG. 10A, the same reference numerals are assigned to the same components described with reference to FIG. 7, and thus some repetitive descriptions thereof may be omitted to avoid or reduce redundancy.

Referring to FIG. 10A, a pixel PX-1*aij* may include the light emitting element LD and a pixel driving circuit PC-1*aij*.

The pixel driving circuit PC-1*aij* may include first to seventh transistors T1, T2, T3-1, T4, T5, T6, and T7 and the capacitors Cst and Chold.

The first electrode of the third transistor T3-1 may be electrically connected to a first initialization voltage line VL1. A first initialization voltage Vcint may be provided to the first initialization voltage line VL1.

The first initialization voltage Vcint may be greater than a value obtained by subtracting the threshold voltage Vth of the first transistor T1 from the reference voltage Vref.

Unlike some embodiments of the present disclosure, when the first initialization voltage Vcint is less than the value obtained by subtracting the threshold voltage Vth of the first transistor T1 from the reference voltage Vref, the voltage of "Vref−Vth" may not be provided to the second node N2 during the second period t2 (see FIG. 4). The source of the first transistor T1 may not be compensated. However, according to some embodiments of the present disclosure, the first initialization voltage Vcint may be greater than the value obtained by subtracting the threshold voltage Vth of the first transistor T1 from the reference voltage Vref. During the second period t2 (see FIG. 8), the source of the first transistor T1 may be easily compensated. Accordingly, it is possible to provide the pixel PX-1*aij* with relatively improved reliability and the display device DD (see FIG. 1) including the same.

The first initialization voltage Vcint may be greater than the value obtained by subtracting the threshold voltage Vth of the first transistor T1 from the first power source ELVDD.

Unlike some embodiments of the present disclosure, when the first initialization voltage Vcint is less than the value obtained by subtracting the threshold voltage Vth of the first transistor T1 from the first power source ELVDD, a current path may be formed through the first power source line PL1, the light emitting element LD, the third transistor T3-1, and the first initialization voltage line VL1 during the second period t2 (see FIG. 8) such that the light emitting element LD is capable of emitting light. However, according to some embodiments of the present disclosure, the first initialization voltage Vcint may be greater than the value obtained by subtracting the threshold voltage Vth of the first transistor T1 from the first power source ELVDD. It may be possible to prevent or reduce instances of the light emitting element LD unnecessarily emitting light during the second period t2 (see FIG. 4). Accordingly, it is possible to provide the pixel PX-1*aij* with relatively improved reliability and the display device DD (see FIG. 1) including the same.

Figure 10B:
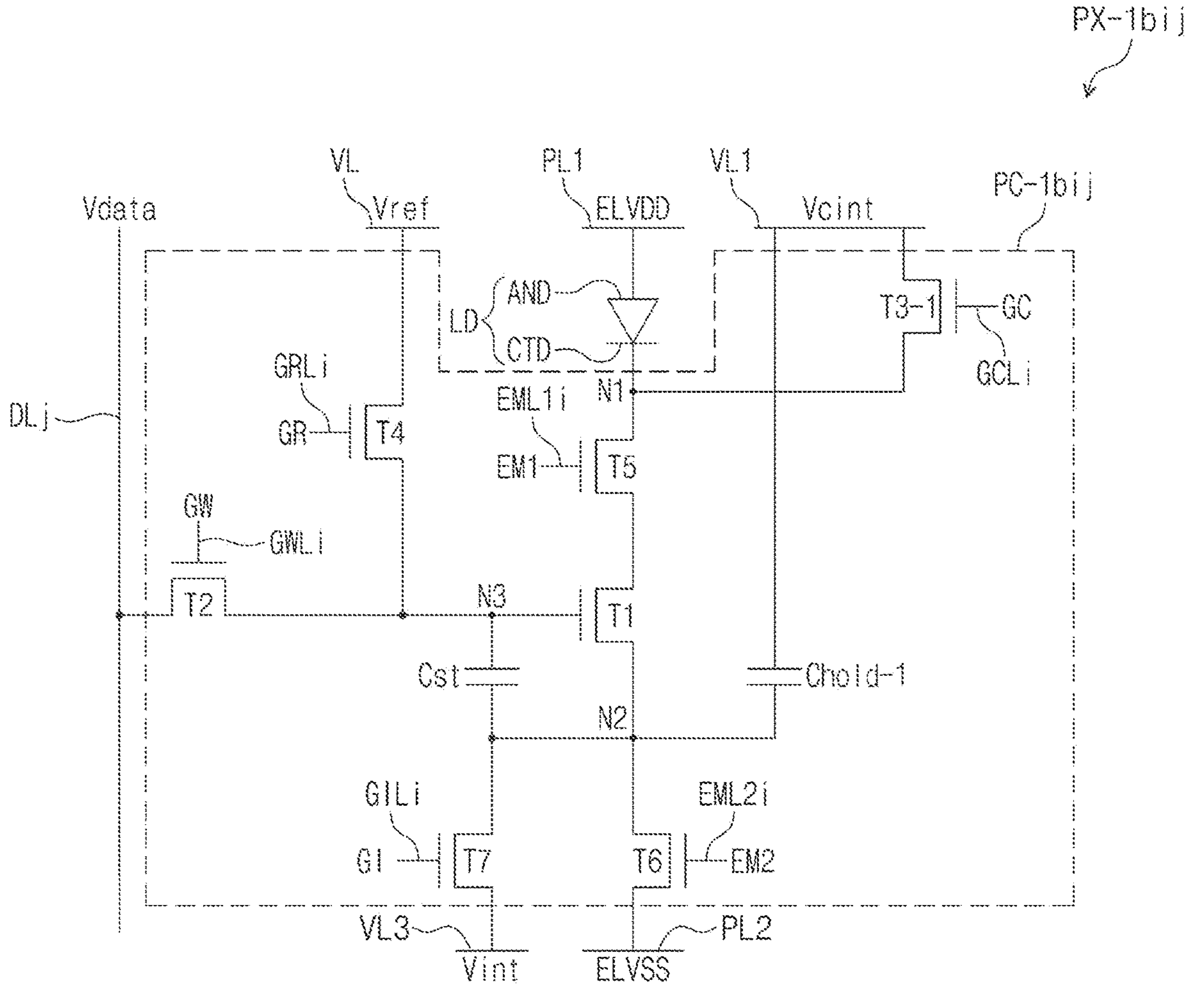
FIG. 10B is an equivalent circuit diagram of a pixel according to some embodiments of the present disclosure.

FIG. 10B is an equivalent circuit diagram of a pixel, according to some embodiments of the present disclosure. In the description of FIG. 10B, the same reference numerals are assigned to the same components described with reference to FIG. 7, and thus some repetitive descriptions thereof may be omitted to avoid or reduce redundancy.

Referring to FIG. 10B, a pixel PX-1*bij* may include the light emitting element LD and a pixel driving circuit PC-1*bij*.

The pixel driving circuit PC-1*bij* may include first to seventh transistors T1, T2, T3-1, T4, T5, T6, and T7 and the capacitors Cst and Chold-1.

The first electrode of the third transistor T3-1 may be electrically connected to a first initialization voltage line VL1. A first initialization voltage Vcint may be provided to the first initialization voltage line VL1.

The first initialization voltage Vcint may be greater than a value obtained by subtracting the threshold voltage Vth of the first transistor T1 from the reference voltage Vref.

The first initialization voltage Vcint may be greater than the value obtained by subtracting the threshold voltage Vth of the first transistor T1 from the first power source ELVDD.

The 2-1st capacitor Chold-1 may be connected between the first initialization voltage line VL1 and the second node N2. One electrode of the 2-1st capacitor Chold-1 may be connected to the first initialization voltage line VL1, which is supplied with the first initialization voltage Vcint, and the other electrode of the 2-1st capacitor Chold-1 may be connected to the second node N2. The 2-1st capacitor Chold-1 may store charges corresponding to a voltage difference between the first initialization voltage Vcint and the second node N2. The 2-1st capacitor Chold-1 may minimize or reduce a voltage change of the second node N2 in response to a voltage change of the third node N3.

Figure 10C:
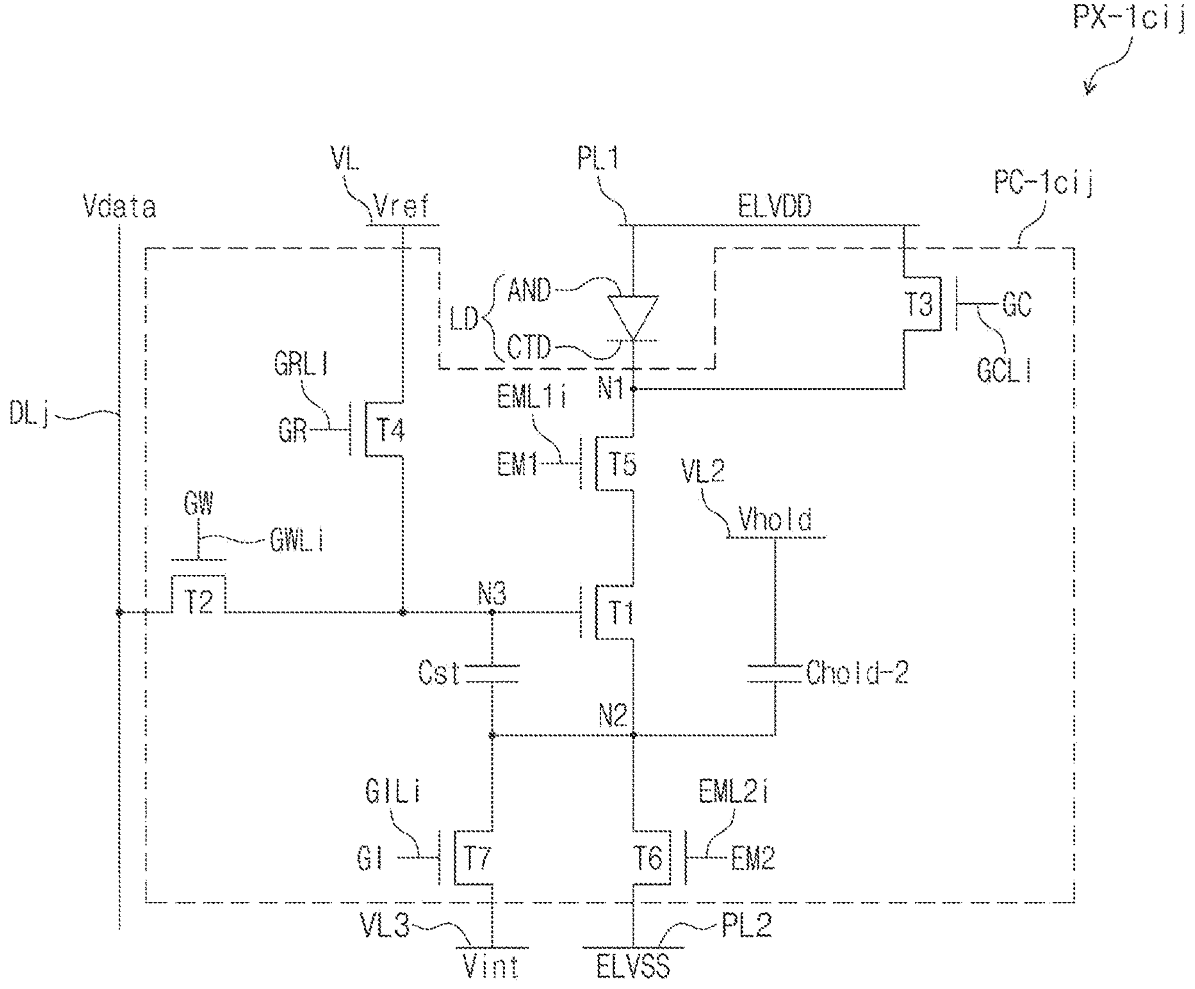
FIG. 10C is an equivalent circuit diagram of a pixel, according to some embodiments of the present disclosure.

FIG. 10C is an equivalent circuit diagram of a pixel, according to some embodiments of the present disclosure. In the description of FIG. 10C, the same reference numerals are assigned to the same components described with reference to FIG. 7, and thus some repetitive descriptions thereof may be omitted to avoid or reduce redundancy.

Referring to FIG. 10C, a pixel PX-1*cij* may include the light emitting element LD and a pixel driving circuit PC-1*cij*.

The pixel driving circuit PC-1*cij* may include first to seventh transistors T1, T2, T3, T4, T5, T6, and T7 and the capacitors Cst and Chold-2.

The 2-2nd capacitor Chold-2 may be connected between a second initialization voltage line VL2 and the second node N2. One electrode of the 2-2nd capacitor Chold-2 may be connected to the second initialization voltage line VL2, which is supplied with the second initialization voltage Vhold, and the other electrode of the 2-2nd capacitor Chold-2 may be connected to the second node N2. The 2-2nd capacitor Chold-2 may store charges corresponding to a voltage difference between the second initialization voltage Vhold and the second node N2. The 2-2nd capacitor Chold-2 may minimize or reduce a voltage change of the second node N2 in response to a voltage change of the third node N3.

The second initialization voltage Vhold may include the first initialization voltage Vcint, the reference voltage Vref, the second power source ELVSS, and the ground voltage. However, this is an example. For example, the second initialization voltage Vhold according to some embodiments of the present disclosure is not limited thereto and may be provided in various ways. For example, the second initialization voltage Vhold may have a voltage level different from a voltage level of each of the first initialization voltage Vcint, the reference voltage Vref, the second power source ELVSS, and the ground voltage generated by the voltage generator 300 (see FIG. 2).

Figure 10D:
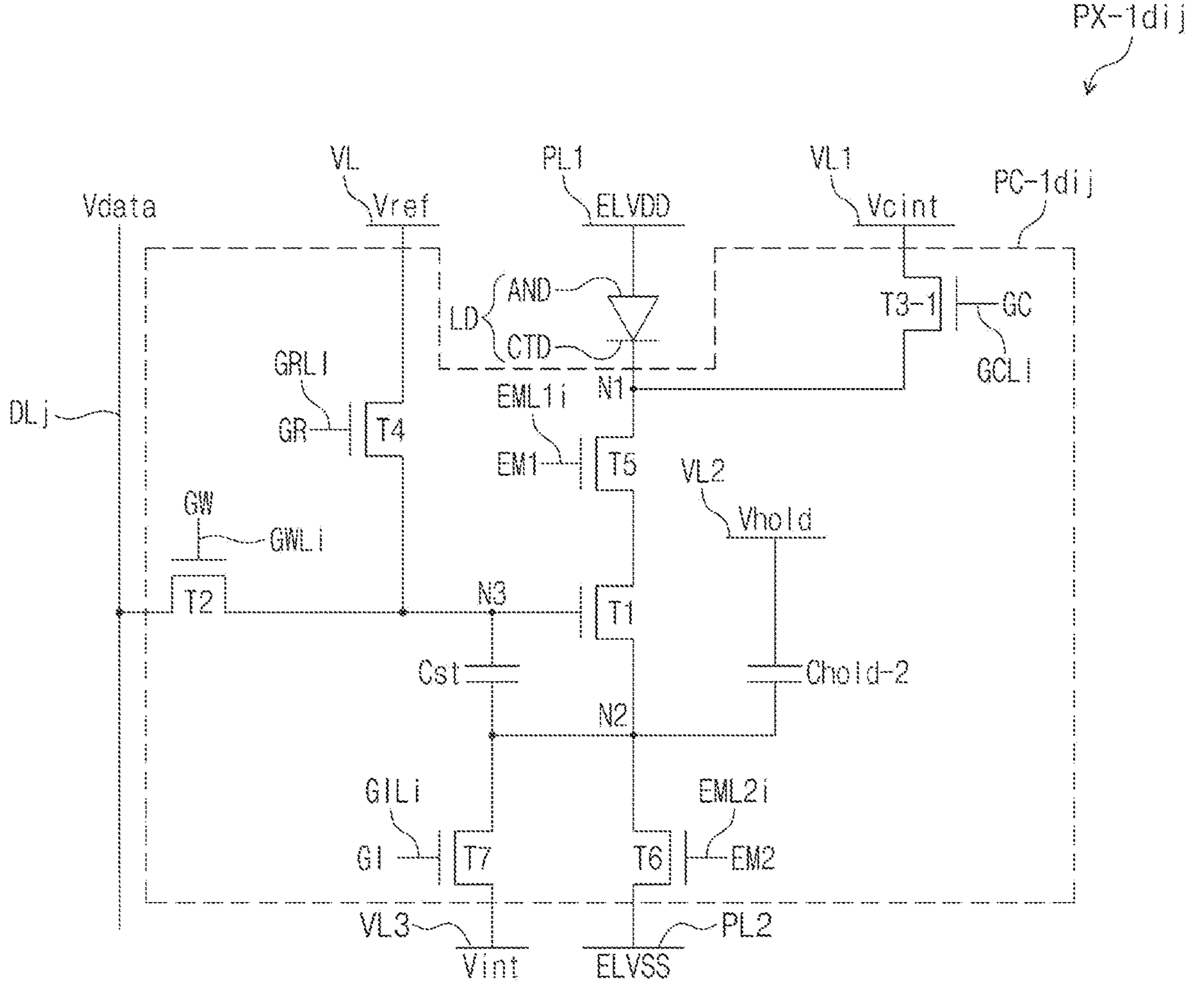
FIG. 10D is an equivalent circuit diagram of a pixel, according to some embodiments of the present disclosure.

FIG. 10D is an equivalent circuit diagram of a pixel, according to some embodiments of the present disclosure. In the description of FIG. 10D, the same reference numerals are assigned to the same components described with reference to FIG. 7, and thus some repetitive descriptions thereof may be omitted to avoid or reduce redundancy.

Referring to FIG. 10D, a pixel PX-1*dij* may include the light emitting element LD and a pixel driving circuit PC-1*dij*.

The pixel driving circuit PC-1*dij* may include first to seventh transistors T1, T2, T3-1, T4, T5, T6, and T7 and the capacitors Cst and Chold-2.

The first electrode of the third transistor T3-1 may be electrically connected to a first initialization voltage line VL1. A first initialization voltage Vcint may be provided to the first initialization voltage line VL1.

The first initialization voltage Vcint may be greater than a value obtained by subtracting the threshold voltage Vth of the first transistor T1 from the reference voltage Vref.

The first initialization voltage Vcint may be greater than the value obtained by subtracting the threshold voltage Vth of the first transistor T1 from the first power source ELVDD.

The 2-2nd capacitor Chold-2 may be connected between a second initialization voltage line VL2 and the second node N2. One electrode of the 2-2nd capacitor Chold-2 may be connected to the second initialization voltage line VL2, which is supplied with the second initialization voltage Vhold, and the other electrode of the 2-2nd capacitor Chold-2 may be connected to the second node N2. The 2-2nd capacitor Chold-2 may store charges corresponding to a voltage difference between the second initialization voltage Vhold and the second node N2. The 2-2nd capacitor Chold-2 may minimize or reduce a voltage change of the second node N2 in response to a voltage change of the third node N3.

Although aspects of some embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, the threshold voltage of a first transistor and a second power source may not affect a driving current flowing through a light emitting element. The light emitting element may be proportional to the square of a difference between a data signal and a reference voltage regardless of characteristics of the first transistor. Moreover, the light emitting element may be proportional to the square of the difference between the data signal and the reference voltage regardless of a voltage level of the second power supply. Accordingly, the luminance of an image output from the display panel may be maintained relatively uniformly. Accordingly, it may be possible to provide a pixel with relatively improved display quality and a display device including the same.

Furthermore, as described above, the first transistor may be an N-type transistor, and a cathode of the light emitting element may be electrically connected to a drain of the first transistor. In this case, even though the light emitting element deteriorates, a voltage of a source terminal of the first transistor, which affects the driving current, may not shift. That is, even though the light emitting element deteriorates, a gate-source voltage of the first transistor may not change. Accordingly, as the range of change in the amount of current flowing through the first transistor may be relatively reduced even when the usage time increases. Accordingly, the afterimage defect (or poor long-term afterimage) of a display panel may be relatively reduced and the lifespan of the display panel may be relatively improved. Accordingly, it may be possible to provide a pixel with relatively improved display quality and a display device including the same.

While aspects of some embodiments of the present disclosure have been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. A pixel comprising:

a light emitting element having an anode and a cathode, the anode connected to a first power source line configured to provide a first power source and the cathode connected to a first node;

a first transistor including a first electrode electrically connected to the first node, a second electrode electrically connected to a second node, and a gate electrode electrically connected to a third node;

a second transistor including a first electrode electrically connected to a data line configured to provide a data signal, a second electrode electrically connected to the third node, and a gate electrode configured to receive a scan signal;

a third transistor including a first electrode, a second electrode electrically connected to the first node, and a gate electrode configured to receive a compensation scan signal;

a fourth transistor including a first electrode electrically connected to a reference voltage line configured to provide a reference voltage, a second electrode electrically connected to the third node, and a gate electrode configured to receive an initialization scan signal; and a first capacitor connected between the second node and the third node.

2. The pixel of claim 1, wherein the first electrode of the third transistor is electrically connected to the first power source line.

3. The pixel of claim 1, further comprising:

a fifth transistor including a first electrode electrically connected to the first node, a second electrode electrically connected to the first electrode of the first transistor, and a gate electrode configured to receive a first emission signal.

4. The pixel of claim 3, further comprising:

a sixth transistor including a first electrode electrically connected to the second node, a second electrode electrically connected to a second power source line configured to provide a second power source having a voltage level lower than the first power source, and a gate electrode configured to receive a second emission signal.

5. The pixel of claim 4, wherein each of the initialization scan signal and the second emission signal is configured to be at an active level during a first period.

6. The pixel of claim 5, wherein the reference voltage is configured to be provided to the third node, and the second power source is configured to be provided to the second node during the first period.

7. The pixel of claim 5, wherein each of the initialization scan signal, the compensation scan signal, and the first emission signal are configured to be at an active level during a second period continuous with the first period.

8. The pixel of claim 7, wherein a voltage value, which is obtained by subtracting a threshold voltage of the first transistor from the reference voltage, is configured to be provided to the second node during the second period.

9. The pixel of claim 7, wherein the scan signal is configured to be at an active level during a third period continuous with the second period.

10. The pixel of claim 9, wherein the data signal is configured to be provided to the third node during the third period.

11. The pixel of claim 9, wherein each of the first emission signal and the second emission signal is configured to be at an active level during a fourth period continuous with the third period.

12. The pixel of claim 1, further comprising:

a second capacitor connected between the second node and the first power source line.

13. The pixel of claim 1, wherein the first electrode of the third transistor is electrically connected to a first initialization voltage line configured to provide a first initialization voltage.

14. The pixel of claim 13, further comprising:

a 2-1st capacitor connected between the second node and the first initialization voltage line.

15. The pixel of claim 13, further comprising:

a 2-2nd capacitor connected between the second node and a second initialization voltage line configured to provide a second initialization voltage having a voltage level different from a voltage level of the first initialization voltage.

16. The pixel of claim 13, wherein the first initialization voltage is greater than a voltage level obtained by subtracting a threshold voltage of the first transistor from the reference voltage.

17. The pixel of claim 1, further comprising:

a seventh transistor including a first electrode electrically connected to the second node, a second electrode electrically connected to a third initialization voltage line configured to provide a third initialization voltage, and a gate electrode configured to receive an input scan signal.

18. A display device comprising:

a display panel including a plurality of pixels, wherein each of the plurality of pixels includes:

a light emitting element having an anode and a cathode, the anode connected to a first power source line configured to provide a first power source and the cathode connected to a first node;

a first transistor including a first electrode electrically connected to the first node, a second electrode electrically connected to a second node, and a gate electrode electrically connected to a third node;

a second transistor including a first electrode electrically connected to a data line configured to provide a data signal, a second electrode electrically connected to the third node, and a gate electrode configured to receive a scan signal;

a third transistor including a first electrode electrically connected to the first power source line, a second electrode electrically connected to the first node, and a gate electrode configured to receive a compensation scan signal;

a fourth transistor including a first electrode electrically connected to a reference voltage line configured to provide a reference voltage, a second electrode electrically connected to the third node, and a gate electrode configured to receive an initialization scan signal; and a first capacitor connected between the second node and the third node.

19. The display device of claim 18, further comprising:

a fifth transistor including a first electrode electrically connected to the first node, a second electrode electrically connected to the first electrode of the first transistor, and a gate electrode configured to receive a first emission signal; and a sixth transistor including a first electrode electrically connected to the second node, a second electrode electrically connected to a second power source line configured to provide a second power source having a voltage level lower than the first power source, and a gate electrode configured to receive a second emission signal.

20. The display device of claim 18, further comprising:

a second capacitor connected between the second node and the first power source line.

21. An electronic device comprising:

a display device including a display panel including a plurality of pixels, wherein each of the plurality of pixels includes:

a light emitting element having an anode and a cathode, the anode connected to a first power source line configured to provide a first power source and the cathode connected to a first node;

a first transistor including a first electrode electrically connected to the first node, a second electrode electrically connected to a second node, and a gate electrode electrically connected to a third node;

a second transistor including a first electrode electrically connected to a data line configured to provide a data signal, a second electrode electrically connected to the third node, and a gate electrode configured to receive a scan signal;

a third transistor including a first electrode, a second electrode electrically connected to the first node, and a gate electrode configured to receive a compensation scan signal;

a fourth transistor including a first electrode electrically connected to a reference voltage line configured to provide a reference voltage, a second electrode electrically connected to the third node, and a gate electrode configured to receive an initialization scan signal; and a first capacitor connected between the second node and the third node, wherein current through the light emitting element flows between the first power source line and a second power source line configured to provide a second power source having a voltage level lower than the first power source.

* * * * *